US007061664B2

(12) United States Patent
Aso et al.

(10) Patent No.: US 7,061,664 B2
(45) Date of Patent: Jun. 13, 2006

(54) WAVELENGTH CONVERTER AND WAVELENGTH DIVISION MULTIPLEXING TRANSMISSION METHOD USING THE SAME

(75) Inventors: Osamu Aso, Tokyo (JP); Shu Namiki, Tokyo (JP); Kouki Sato, Tokyo (JP); Hijiri Nimura, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 224 days.

(21) Appl. No.: 10/688,197

(22) Filed: Oct. 17, 2003

(65) Prior Publication Data

US 2004/0184807 A1    Sep. 23, 2004

Related U.S. Application Data

(63) Continuation-in-part of application No. 09/750,535, filed on Dec. 28, 2000, now Pat. No. 6,665,113.

(30) Foreign Application Priority Data

Dec. 28, 1999    (JP)    .................. 11-374813
Oct. 3, 2000    (JP)    .................. 2000-303512

(51) Int. Cl.
G02F 1/365    (2006.01)
G02F 1/39    (2006.01)

(52) U.S. Cl. ...................... 359/332; 359/326; 359/330
(58) Field of Classification Search ......... 359/326–332
See application file for complete search history.

(56) References Cited

U.S. PATENT DOCUMENTS

| 5,386,314 | A | 1/1995 | Jopson | 359/326 |
|---|---|---|---|---|
| 5,521,733 | A | 5/1996 | Akiyama et al. | 359/127 |
| 5,532,868 | A | 7/1996 | Gnauck et al. | 359/332 |
| 5,604,618 | A | 2/1997 | Mori et al. | 359/127 |
| 5,619,368 | A | 4/1997 | Swanson | 359/326 |
| 5,636,045 | A | 6/1997 | Okayama et al. | 359/140 |
| 5,920,588 | A | 7/1999 | Watanabe | 359/124 |
| 5,946,129 | A | 8/1999 | Xu et al. | 359/332 |
| 6,252,698 | B1 | 6/2001 | Oikawa | 359/326 |
| 6,307,984 | B1 | 10/2001 | Watanabe | 385/24 |
| 6,324,318 | B1 | 11/2001 | Suzuki | 385/24 |
| 6,504,972 | B1 | 1/2003 | Watanabe | 385/24 |

(Continued)

OTHER PUBLICATIONS

Xu et al, "1.5 μm band efficient broadband wavelength conversion by difference frequency generation in a periodically domain-inverted LiNbO3 channel waveguide", Applied Physics Letters, vol. 63, No. 26, Dec. 27, 1993, pp. 3559-3561.*

(Continued)

*Primary Examiner*—John D. Lee
(74) *Attorney, Agent, or Firm*—Knobbe Martens Olson & Bear LLP

(57) ABSTRACT

A wavelength converter using difference frequency generation (DFG) is disclosed. In one embodiment, the wavelength converter comprises (a) a first optical filter configured to filter out one or more lightwaves requiring wavelength conversion from wavelength-division multiplexed (WDM) lightwaves, and (b) a broadband multi-channel simultaneous wavelength conversion portion comprising a pump source that generates pump light for use in the process of the DFG, a first optical combiner for combining said pump light with said filtered lightwaves, a high non-linear medium configured to generate wavelength converted lightwaves from said filtered lightwaves using the DFG, and a second optical filter for filtering said wavelength converted from said filtered lightwaves.

14 Claims, 26 Drawing Sheets

Experimental setup

U.S. PATENT DOCUMENTS 6,665,113 B1 * 12/2003 Aso et al. .................. 359/326
6,801,355 B1 * 10/2004 Sher et al. ................. 359/326

OTHER PUBLICATIONS

Watanabe, "Broadband Wavelength Conversion and Optical Phase Conjugation Using a Highly-nonlinear Fiber Four-wave Mixer," *Third Optoelectronics and Communications Conference (OECC '98) Technical Digest*, pp. 84-85, 1998.

Lee et al., "A Wavelength-Convertible Optical Network," *Journal of Lightwave Technology*, vol. 11, No. 5/8, pp. 962-970, 1993.

Yoo, "Wavelength Conversion Technologies for WDM Network Applications," *Journal of Lightwave Technology*, vol. 14, No. 6, pp. 955-966, 1996.

Watanabe et al., "Interband Wavelength Conversion of 320 Gb/s (32x10 Gb/s) WDM Signal Using a Polarization-Insensitive Fiber Four-Wave Mixer."*ECOC '98*, 20-24, 1998.

Aso et al., "Broadband Four-Wave Mixing Generation In Short Optical Fibres," *Electronics Letters*, vol. 36, No. 8, 2000.

* cited by examiner

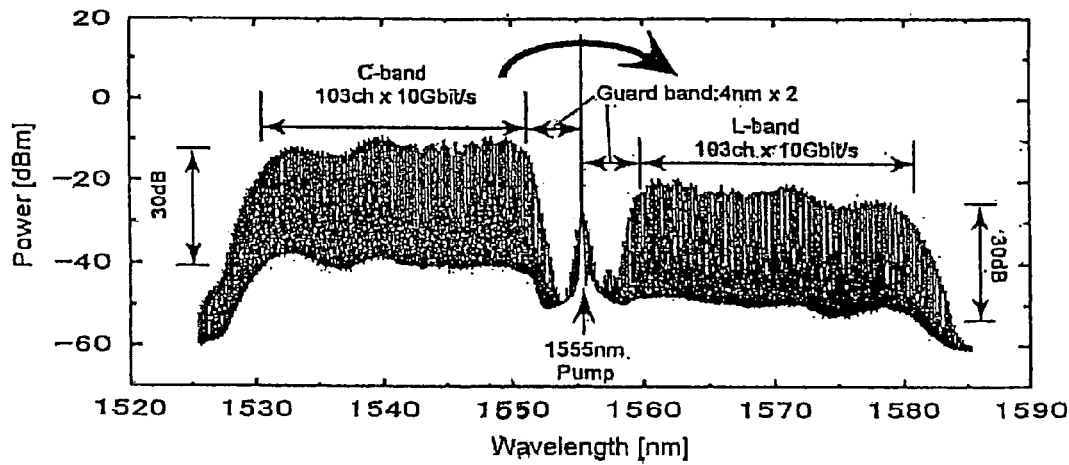
FIG.29  PPLN output spectrum
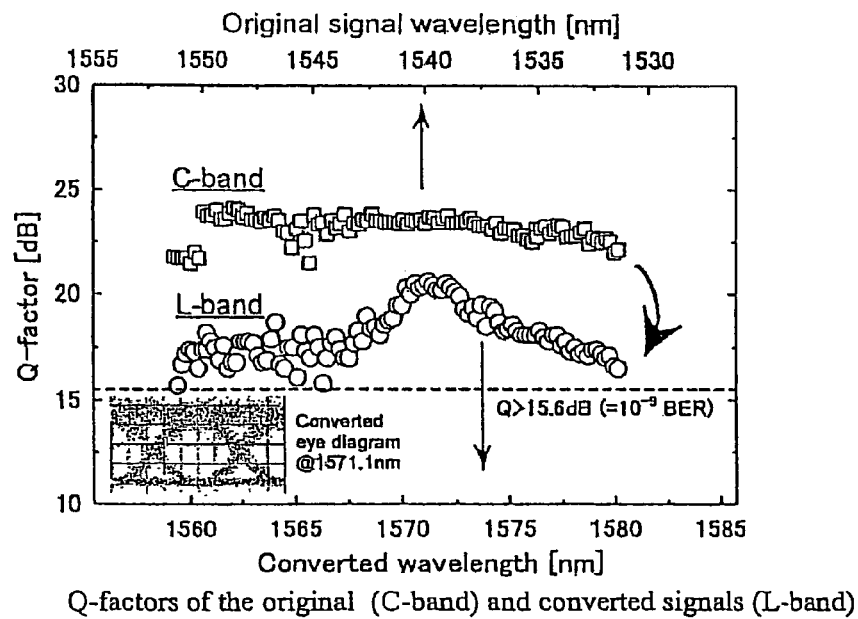
Q-factors of the original (C-band) and converted signals (L-band)
FIG.30

WAVELENGTH CONVERTER AND WAVELENGTH DIVISION MULTIPLEXING TRANSMISSION METHOD USING THE SAME

RELATED APPLICATIONS

This application is a continuation-in-part (CIP), and hereby incorporates by reference the entire disclosure, of U.S. patent application Ser. No. 09/750,535, now U.S. Pat. No. 6,665,113, entitled "WAVELENGTH CONVERTER AND WAVELENGTH DIVISION MULTIPLEXING TRANSMISSION METHOD USING THE SAME", and filed on Dec. 28, 2000, which claims priority to Japanese Application Nos. 2000-303512 and 11-374813, filed on Oct. 3, 2000 and Dec. 28, 1999, respectively.

BACKGROUND OF THE INVENTION

1. Field of the Invention

The present invention relates to a wavelength converter applicable to a network based on wavelength-division multiplexing (WDM) transmission in optical communication systems.

2. Description of the Related Art

Because of the developments of the WDM transmission technologies and optical amplifiers, WDM networks have been studied extensively by many researchers. Interconnection of the WDM systems that are independently designed and constructed is required cost effectively. For the purpose of satisfying the requirements, several types of the wavelength conversion techniques have been studied. Fiber-optic four-wave mixing (FWM) based parametric wavelength conversion is one of the very promised techniques for applying to the broadband WDM networks because of its bit-rate transparency (response time~100 fs), and its ability to process the multi-channels optical signals simultaneously. It is known that the FWM based parametric wavelength conversion is also realized in semiconductor optical amplifiers (SOA's). Since the multi-channels simultaneous wavelength conversion is realized by optical parametric processes in nonlinear media, it seems that so far most of the researchers have devoted to broaden the bandwidth of the wavelength conversion in wavelength domain to follow the increment of the extraordinary number of channels. However, from the practical point of view, not only the broadband multi-channels simultaneous wavelength conversion, but also different applications of the parametric wavelength conversion to the WDM networks should be conceived to enhance the flexibility of the signal processing.

SUMMARY OF THE INVENTION

An object of the present invention is to provide a wavelength converter in which only some lightwaves that are the constituent of all the WDM lightwaves, are filtered out in frequency domain, then only the filtered out lightwaves are wavelength converted parametrically by use of FWM in optical fiber or in SOA, and to provide WDM transmission methods in which the above types of the parametric wavelength converter is applied to enhance the flexibility of the wavelength routing and signal processing in WDM networks.

Because of its frequency dependence of the transmittance and/or reflectivity of the filtering components, such as dielectric thin films and gratings, some lightwaves that are constituent of the inputted WDM lightwaves (hereafter referred as the original WDM lightwaves), can be filtered out then transmitted (or reflected) lightwaves are outputted from the one output port. The remained lightwaves not to be transmitted (or not to be reflected) are reflected (or transmitted) and outputted from the other output port. Solely the transmitted (or reflected) lightwaves outputted from the components can be simultaneously wavelength converted by the parametric wavelength converter concatenated with after the filtering components. The present invention provides a wavelength converter in which the lightwaves, that are required to be wavelength converted, are filtered out by one or more filtering components, then the filtered out lightwaves are simultaneously wavelength converted by a FWM based parametric wavelength converter. The present invention provides further a wavelength converter in which, WDM lightwaves are divided by an optical divider, the one divided WDM lightwaves are outputted from the one output port of the divider directly. The other lightwaves are outputted from each the remained output port and lightwaves outputted from each output port are wavelength converted independently. The wavelength converted WDM lightwaves after outputted from the output ports, and the WDM lightwaves not to be wavelength converted after outputted from the divider, are combined with together without duplicating in frequency domain. The present invention also provides wavelength-division multiplexing transmission methods using the FWM based parametric wavelength converters concatenated with after the optical filters or the optical dividers.

According to a first aspect of the present invention, there is provided a first wavelength converter by use of four-wave mixing (FWM) in an optical fiber or a semiconductor optical amplifier (SOA), in which one or more channels of the lightwaves are filtered out from the original wavelength-division multiplexed (WDM) lightwaves using optical filters, and the channels of the filtered out WDM lightwaves are launched into the wavelength converter as the lightwaves required to be wavelength converted, and solely the lightwaves required to be wavelength converted are wavelength converted.

According to a second aspect of the present invention, there is provided a second wavelength converter in which, in the first wavelength converter, the lightwaves required to be wavelength converted are obtained from the original WDM lightwaves by applying optical filters, and the wavelength converted lightwaves are obtained from the filtered out lightwaves by use of the FWM in an optical fiber or in an SOA, and the wavelength converted lightwaves are combined with one or more lightwaves not to be filtered out by the optical filter in order to provide an alternative channel configuration of the WDM lightwaves to the original WDM lightwaves in wavelength domain.

According to a third aspect of the present invention, there is provided a third wavelength converter in which, in the first wavelength converter, the wavelength converted lightwaves are combined with one or more extra lightwaves any of whose wavelength is not coincided with all the wavelength of the wavelength converted lightwaves to provide an alternative channel configuration of the WDM lightwaves to the original WDM lightwaves in wavelength domain.

According to a fourth aspect of the present invention, there is provided a fourth wavelength converter in which, in anyone of the first to third wavelength converter, one or more filter type optical components are used to filter out the lightwaves periodically at N channels (N is an integer) spacing from the original WDM lightwaves by each components, then the lightwaves that are filtered out by each filter type optical component are wavelength converted independently or simultaneously by use of the FWM in an optical fiber or in an SOA.

According to a fifth aspect of the present invention, there is provided a fifth wavelength converter in which, in the fourth wavelength converter, N filter type optical components capable to filter out the lightwaves periodically at N channels (N is an integer) spacing from the original WDM lightwaves are used, then the one or more of the filtered out lightwaves are wavelength converted independently or simultaneously by use of the FWM in an optical fiber or in an SOA, and the wavelength converted lightwaves are combined with the lightwaves not to be filtered out to provide an alternative channel configuration of the WDM lightwaves whose channel interval is larger than that of the original WDM lightwaves inputted to the wavelength converter.

According to a sixth aspect of the present invention, there is provided a sixth wavelength converter in which, in anyone of the first to third wavelength converter, total wavelength bandwidth of the original WDM lightwaves inputted to the wavelength converter are virtually divided into n (n is an integer) local wavelength bands (hereafter referred as "sub-bands" and not necessary all the bandwidth of the sub-bands are equivalent), and filter type optical components are used to filter out one or more sub-bands from the original WDM lightwaves, and the sub-bands that are filtered out by the optical components are wavelength converted independently or simultaneously by use of the FWM in an optical fiber or in an SOA.

According to a seventh aspect of the present invention, there is provided a seventh wavelength converter in which, in the sixth wavelength converter, n–1 filter type optical components capable to filter out the lightwaves of the j-th sub-band (j is an integer) from the original WDM lightwaves are used, and the lightwaves inside one or more of the sub-bands are filtered out by each filter, and the filtered out sub-bands are wavelength converted independently or simultaneously, and the wavelength converted lightwaves are combined with the lightwaves not to be filtered out to provide an alternative channel configuration of the WDM lightwaves whose channel interval in frequency domain is smaller than that of the original WDM lightwaves.

According to an eighth aspect of the present invention, there is provided an eighth wavelength converter in which, output port of the fourth or fifth wavelength converters is connected with input port of a wavelength demultiplexing devices to demultiplex the wavelength converted WDM lightwaves whose frequency interval is expanded by the fourth or fifth wavelength converter in comparison with the original WDM lightwaves, thereby providing a wavelength de multiplexing module.

According to a ninth aspect of the present invention, there is provided a ninth wavelength converter in which using four-wave mixing (FWM) in an optical fiber or a semiconductor optical amplifier (SOA), in which one or more wavelength-division multiplexing (WDM) lightwaves are divided by an optical divider, and lightwaves output from the one or more output ports of the divider are wavelength converted by use of the FWM in an optical fiber or in an SOA.

According to a tenth aspect of the present invention, there is provided a tenth wavelength converter in which, in the ninth wavelength converter, the lightwaves outputted from the one output ports of the divider are combined with the wavelength converted lightwaves that are converted after outputted from the other output ports of the optical divider, without any duplication in frequency domain to increase numbers of the WDM lightwaves.

According to an eleventh aspect of the present invention, there is provided an eleventh wavelength converter in which, in the ninth wavelength converter, the wavelength converted lightwaves after outputted from the optical divider are combined with one or more lightwaves any of whose wavelength is not coincided with all the wavelength of the wavelength converted lightwaves to provide an alternative channel configuration of the WDM lightwaves to the original WDM lightwaves in wavelength domain. According to the twelfth aspect of the present invention, there is provided a first wavelength-division multiplexing (WDM) transmission method in which wavelength converted WDM lightwaves whose frequency intervals are made wider than the wavelength intervals of the original WDM lightwaves by use of the fourth or fifth wavelength converter, are transferred from an optical communication system whose transmission line is composed of the optical fiber less influenced by the inter-channel crosstalk to a system whose transmission line more influenced by the crosstalk than the other transmission line.

According to the thirteenth aspect of the present invention, there is provided a second WDM transmission method in which WDM lightwaves whose frequency intervals are made narrower than the frequency intervals of the WDM lightwaves by use of the sixth or the seventh wavelength converter, are transferred from an optical communication system whose transmission line is composed of the optical fiber easily influenced by the inter-channel crosstalk to a system whose transmission line is less influenced by the crosstalk than the other transmission line.

According to the fourteenth aspect of the present invention, there is provided a third WDM transmission method in which, in the second WDM method, additional external WDM lightwaves are combined with the wavelength converted lightwaves to increase channel numbers, and the frequency interval of the combined lightwaves are narrower than the interval of the original WDM lightwaves by use of the sixth or the seventh wavelength converter, and the resultant WDM lightwaves are transmitted.

According to yet another embodiment, the invention provides a wavelength converter using different frequency generation (DFG). The wavelength converter comprises a first optical filter configured to filter out one or more lightwaves requiring wavelength conversion from wavelength-division multiplexed (WDM) lightwaves. The wavelength converter further comprises a broadband multi-channel simultaneous wavelength conversion portion comprising a pump source that generates pump light for use in the process of the DFG, a first optical combiner for combining said pump light with said filtered lightwaves, a high non-linear medium configured to generate wavelength converted lightwaves from said filtered lightwaves using DFG, and a second optical filter for filtering said wavelength converted lightwaves from said filtered.

BRIEF DESCRIPTION OF THE DRAWINGS

FIG. 29 shows a graphical illustration of the output spectrum of a periodically poled $LiNbO_3$ (PPLN) waveguide in accordance with one embodiment of the invention.

FIG. 30 illustrates converted Q-factor for 103 channels of the wavelength converter of FIG. 28.

DETAILED DESCRIPTION OF THE PREFERRED EMBODIMENTS

First Embodiment of Wavelength Converter

Figure 1:
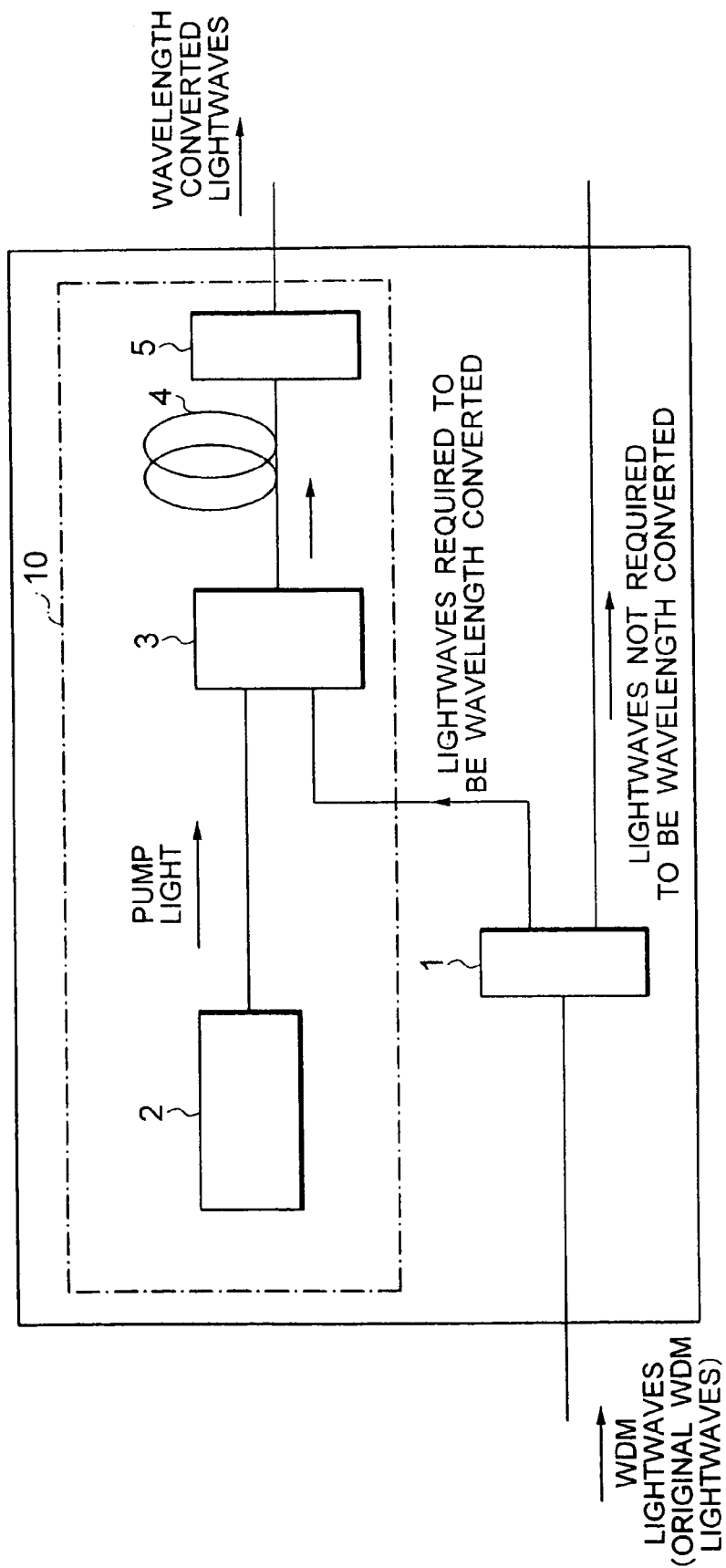
FIG. 1 is an explanatory schematic showing a wavelength converter according to a first embodiment of the present invention.

A wavelength converter according to a first embodiment of the present invention will now be explained with reference to FIG. 1. The wavelength converter corresponds to the aforementioned first aspect of the present invention. In FIG. 1, a broadband multi-channel simultaneous wavelength conversion portion 10 is composed of a pump source 2 that generates pump light for the use of the FWM generation, an optical combiner 3 for combining the pump light with lightwaves required to be wavelength converted filtered out from original WDM lightwaves by an optical filter 1, a nonlinear element (optical fiber for the use of wavelength conversion) 4 to generate wavelength converted lightwaves as a resultant of the FWM, and an optical filter 5 for removing the pump and the lightwaves required to be wavelength converted of the output lightwaves from the optical fiber 4. And an optical component 1 (for example, optical filter 1) capable of filtering out the lightwaves required to be wavelength converted from the original WDM lightwaves is also the constituent of the broadband multi-channels simultaneous wavelength conversion portion 10. The optical fiber 4 as a nonlinear element shown in FIG. 4 can be replaced by a semiconductor optical amplifier (SOA). The concept of the optical filter 5 is interpreted more wider sense, the filter includes e.g., nonlinear-optical loop mirror. The above definition is generally used to the other drawings appeared in the following embodiments throughout the documents.

In this wavelength converter, one or more optical lightwaves required to be wavelength converted are predetermined (hereafter referred as "lightwaves required to be wavelength converted") and are filtered out from the original WDM lightwaves by use of the optical filter 1, and the remained lightwaves that are not required to be "wavelength converted" is outputted from the other port of the optical filter 1. The lightwaves required to be wavelength converted are combined with pump light emitted from the pumping source 2 by the optical combiner 3. The combined lightwaves are launched into the optical fiber 4 to generate four-wave mixing. Output lightwaves from the fiber 4 is then launched into the optical filter 5 to remove both the pump light and the lightwaves required to be wavelength converted. Consequently, solely the wavelength converted lightwaves are outputted at the output end of the filter 5. By changing wavelength dependence of the transmittance characteristics, various types of the wavelength conversion can be realized.

Second Embodiment of Wavelength Converter

Figure 2:
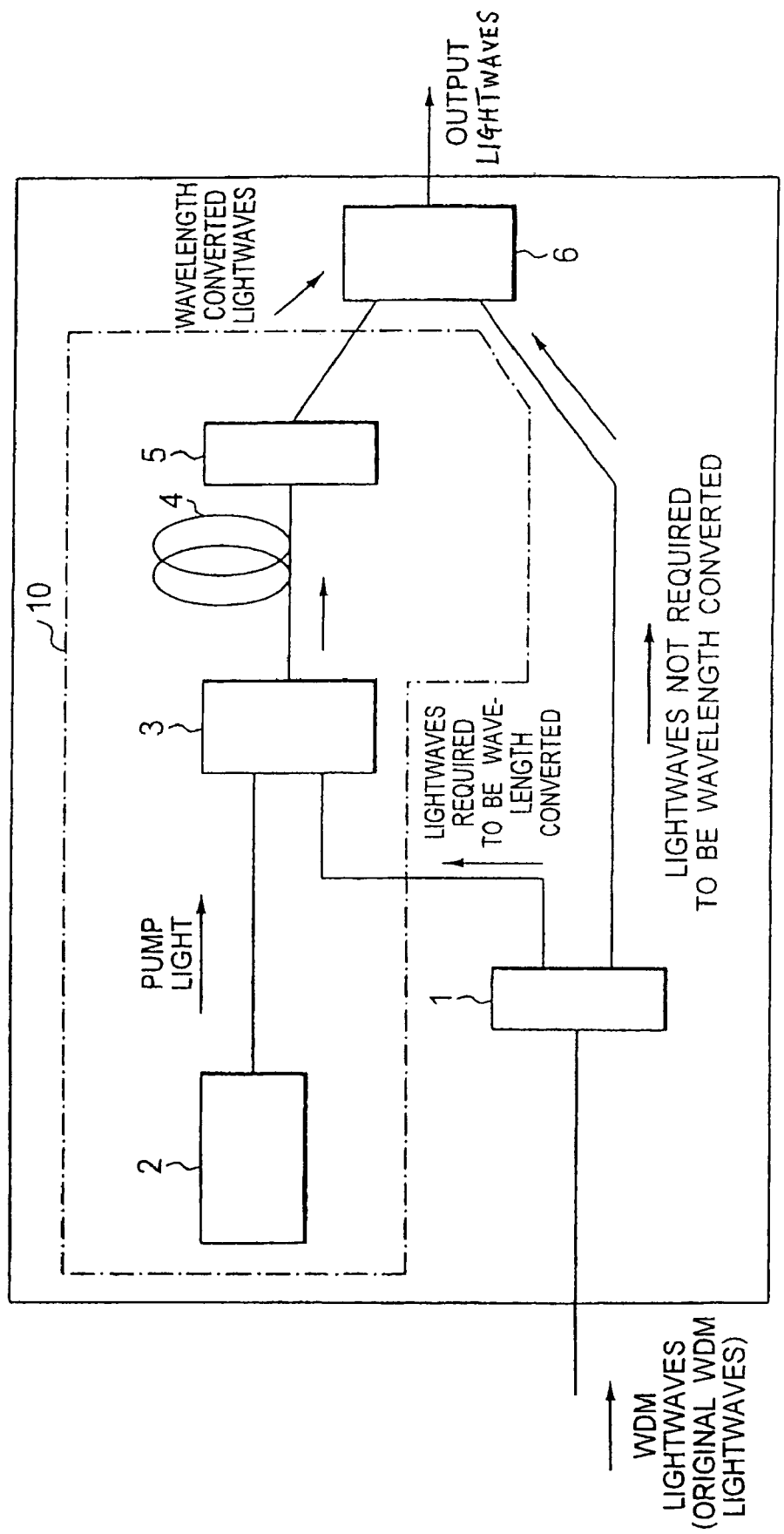
FIG. 2 is an explanatory schematic showing a wavelength converter according to a second embodiment of the present invention.
Figure 3:
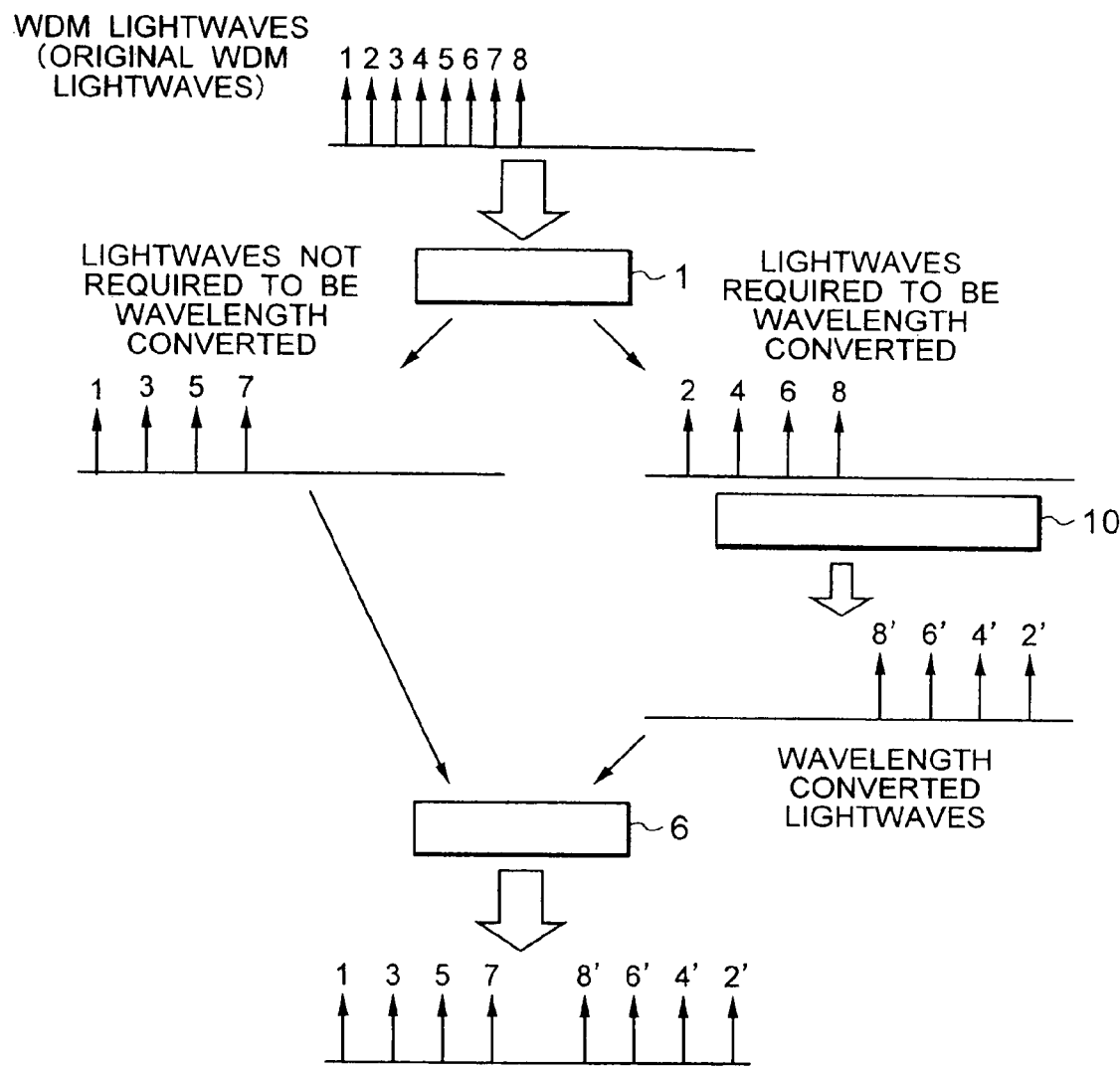
FIG. 3 is a view for explaining wavelength conversion procedures of lightwaves in the second wavelength converter shown in FIG. 2.

A wavelength converter according to a second embodiment of the present invention will now be explained with reference to FIGS. 2 and 3. The wavelength converter corresponds to the aforementioned second aspect of the present invention. FIG. 3 is a view for explaining wavelength conversion procedures of lightwaves in the second wavelength converter. In FIG. 2, a broadband multi-channel simultaneously wavelength conversion portion 10 is composed of a pump source 2, an optical combiner 3, optical fiber 4 and an optical filter 5. An optical filter 1 and an optical combiner 6 are both constituent of the portion 10. The optical filter 1 is applied to filter out the lightwaves required to be wavelength converted from the original WDM lightwaves with channel intervals N=1 (filtering out the channels alternately) in wavelength domain. The optical filter 1 is a Fabry-Perot etalon filter in this embodiment and transmittance of the filter 1 has its peaks periodically in 2 channels spacing in wavelength domain. The lightwaves required to be wavelength converted are combined with pump light emitted from the pump source 2 by an optical combiner 3. The combined lightwaves are launched into the optical fiber 4 and wavelength converted lightwaves are generated simultaneously by virtue of the FWM in the fiber 4. Solely the wavelength converted lightwaves are filtered out by the optical filter 5. The wavelength converted lightwaves output from the portion 10 are combined with the lightwaves required not to be wavelength converted that are outputted from the optical filter 1. Consequently, configuration of the wavelength of WDM lightwaves outputted from the wavelength converter is different from the original WDM lightwaves. The wavelength interval of the WDM lightwaves outputted from the wavelength converter is broader than that of the original WDM lightwaves by twice.

Third Embodiment of Wavelength Converter

Figure 4:
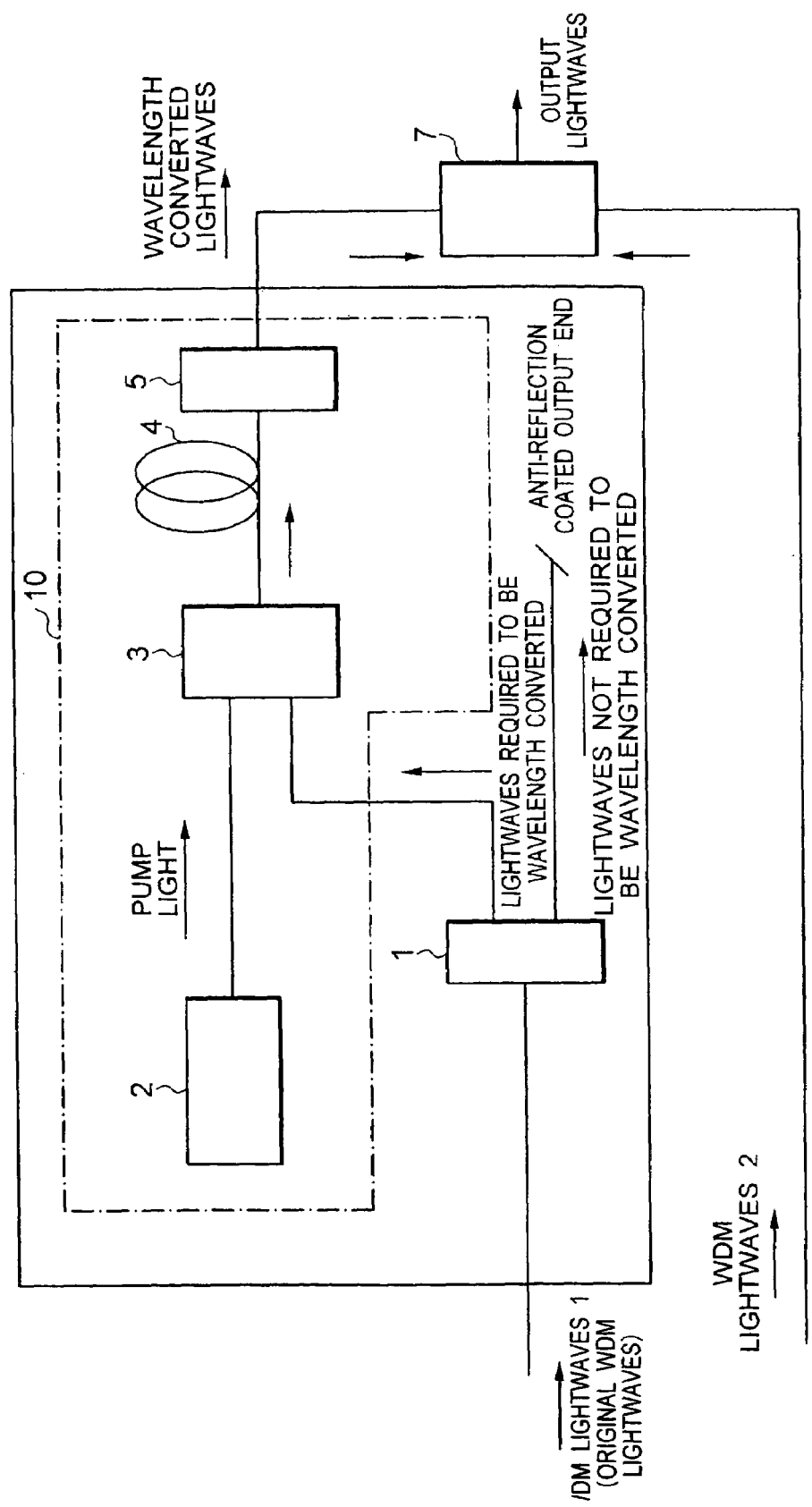
FIG. 4 is an explanatory schematic showing a wavelength converter according to a third embodiment of the present invention.
Figure 5:
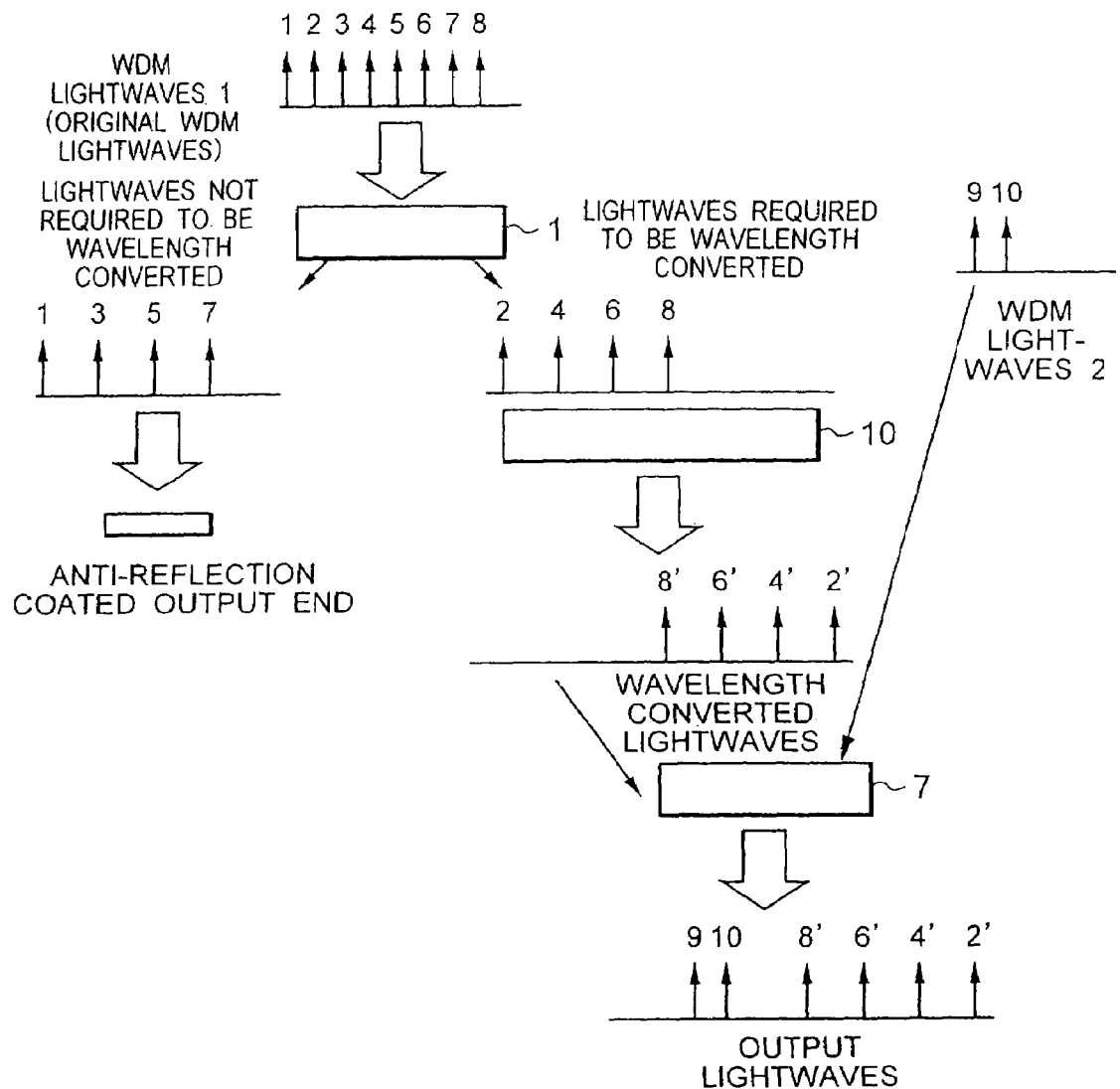
FIG. 5 is a view for explaining wavelength conversion procedures of lightwaves in the third wavelength converter shown in FIG. 4.

A wavelength converter according to a third embodiment of the present invention will now be explained with reference to FIGS. 4 and 5. Schematic of the apparatus of the wavelength converter is shown in FIG. 4. FIG. 5 is a view for explaining wavelength conversion procedures of lightwaves in the third wavelength converter. In FIG. 4, a broadband multi-channel simultaneously wavelength conversion portion 10 is composed by a pump source 2, an optical combiner 3, optical fiber 4 and an optical filter 5. An optical filter 1 and an optical combiner 7 are both constituent of the portion 10. As shown in FIG. 5, the lightwaves required to be wavelength converted are filtered out on alternate channels from the WDM lightwaves 1, and the lightwaves required to be wavelength-converted are combined with pump light from the pump source 2 by an optical combiner 3. The combined lightwaves are launched into the optical fiber 4 and wavelength converted lightwaves are generated by four-wave mixing (FWM) in the fiber. Output lightwaves from the optical fiber 4 is launched into the optical filter 5 and solely the wavelength converted lightwaves are outputted from the filter 5. The end of the other output port of the optical filter 1 is anti-reflection coated not to output the lightwaves required not to be wavelength converted. Thus the wavelength converted lightwaves and externally launched WDM lightwaves 2 are combined with by the optical combiner 7 to reconfigure alternative WDM lightwaves in wavelength domain. Concerning the wavelength conversion, it should be remarked that any wavelength of the wavelength converted lightwaves must not be coincided with all the wavelength of the launched WDM lightwaves.

The wavelength of the pump light $\lambda_p$ generated from the pump source 2 shown in FIG. 4 is determined by the frequency phase-matching condition (or equivalently energy conservation law) among the a constituent of the WDM lightwaves 2 whose wavelength is $\lambda_2$ and wavelength of the corresponding wavelength converted lightwave $\lambda'_2$ that is predetermined from the knowledge of the system design. The result is as follows, $$\lambda_p = 2\left(\frac{\lambda_2 \lambda'_2}{\lambda_2 + \lambda'_2}\right) \qquad (1).$$

From the requirement of the propagation constant phase-matching condition (or equivalently momentum conservation law), zero-dispersion wavelength of the optical fiber 4 must be in the vicinity of the $\lambda_p$ represented in equation (1).

Fourth Embodiment of Wavelength Converter

Figure 6:
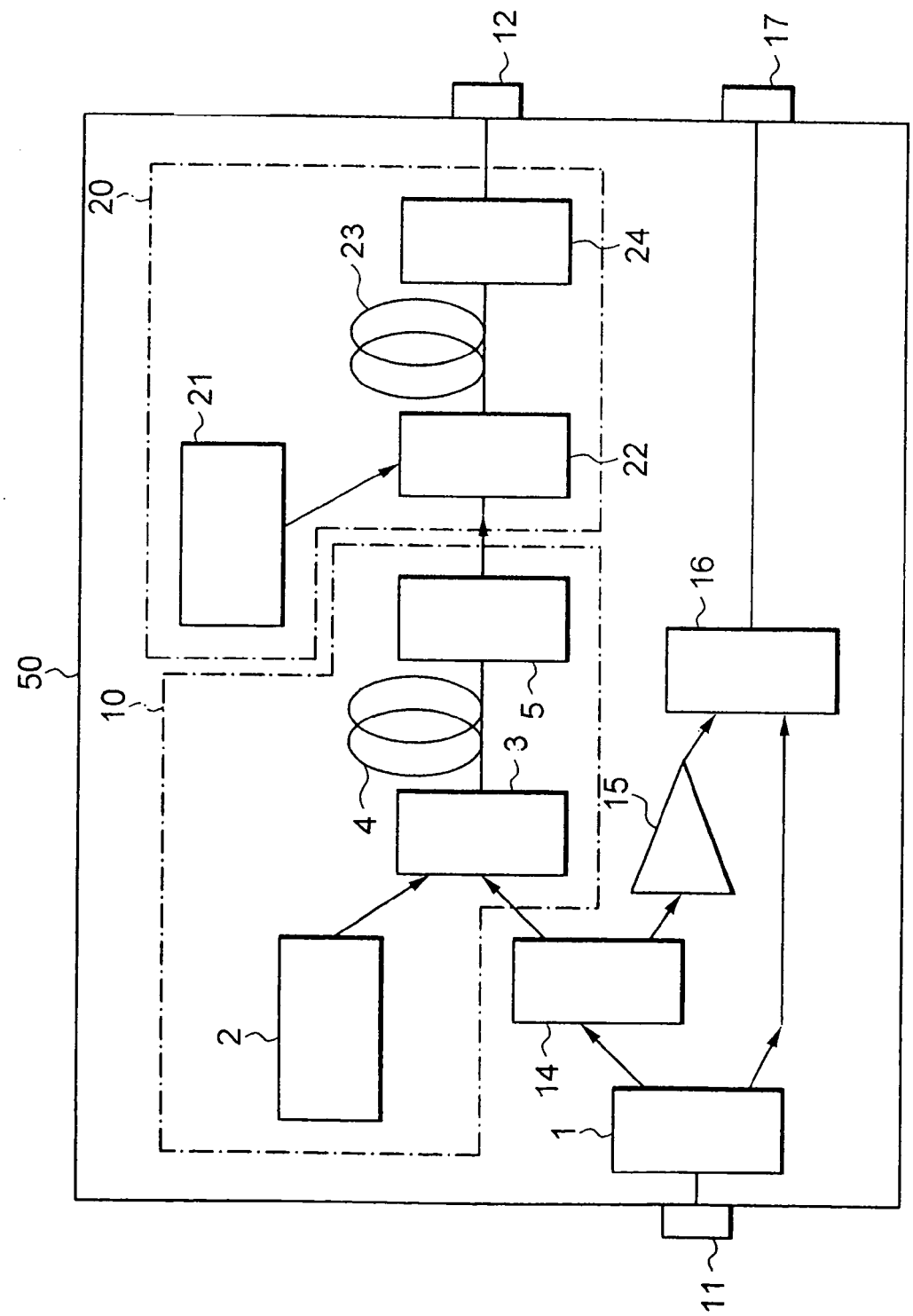
FIG. 6 is an explanatory schematic showing a wavelength converter according to a fourth embodiment of the present invention.
Figure 7:
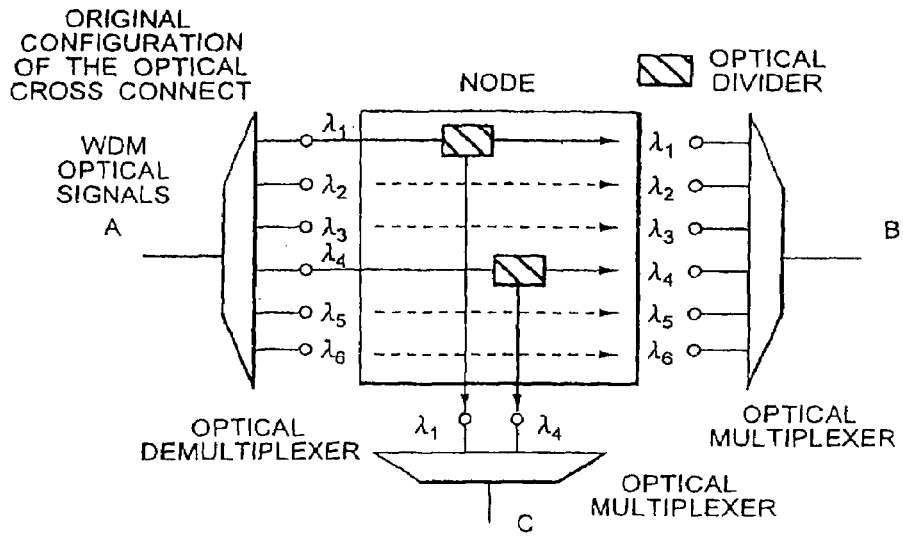
FIG. 7 is an explanatory view showing an example of the optical cross connects based on WDM transmission systems.
Figure 8:
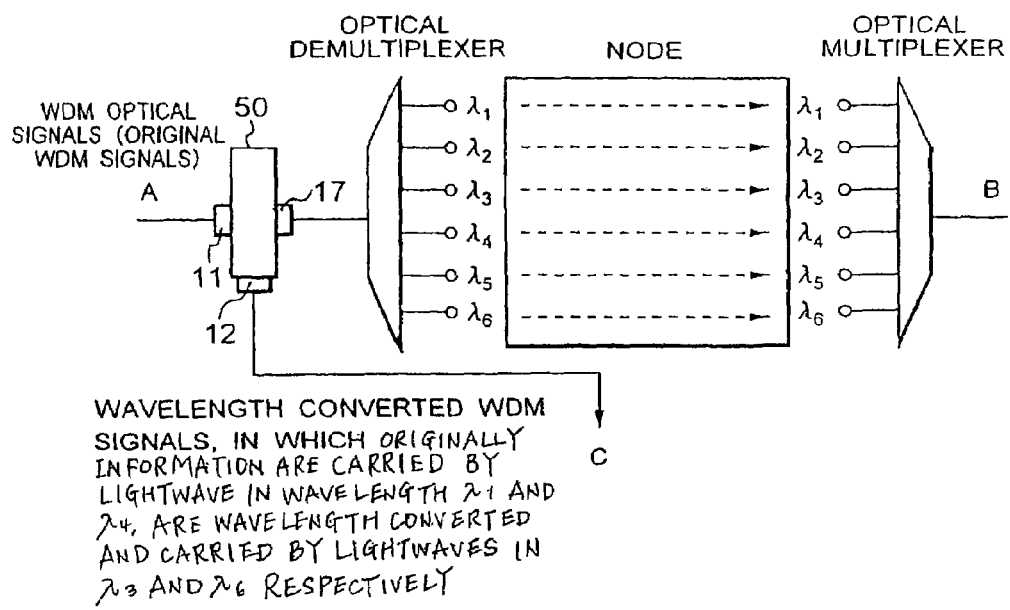
FIG. 8 is a view for explaining a case where the wavelength converter of FIG. 6 is added to enhance the flexibility of the optical cross connect shown in FIG. 7.

A wavelength converter according to a fourth embodiment of the present invention will now be explained with reference to FIGS. 6 to 8. Schematic of the apparatus of the wavelength converter is shown in FIG. 6. FIGS. 7 and 8 show schematic of examples of the optical cross connect based on WDM systems. The wavelength converter is fourth aspect of the present invention. There is 6-channels WDM lightwaves transmitted in the direction from A to Bas shown in FIG. 7. Each wavelength of the 6-channels WDM signals is put to be $\lambda_1$ to $\lambda_6$ respectively. The following situation will be conceived in the discussion: All the signals are demultiplexed into wavelength from $\lambda_1$ to $\lambda_6$ by the optical demultiplexer located into the Aside in FIG. 7. Then the two information carried by the first channel whose wavelength is $\lambda_1$, and carried by the fourth channel whose wavelength is $\lambda_4$ are divided by the optical divider and part of the divided signals are routed to in the direction to C in FIG. 7. In the discussion of the embodiment, the configuration will be referred as the original configuration. In the original configuration, the system supplies the first and fourth channels' information to the customers in the direction C. Now, if it is required later that the information carried by the third and sixth channels (corresponding to the signal wavelength $\lambda_3$ to $\lambda_6$) are transmitted to the direction C instead of the information carried by the signals in $\lambda_1$ and $\lambda_4$ in original configuration. In general, the requirements can not be achieved straightforwardly solely changing the arrangement of the optical demultiplexer because the optical multiplexer is designed and fabricated to made the best performance for transmitting the lightwaves in $\lambda_1$ and $\lambda_4$, and the other devices and components have the same circumstances, e.g., optical amplifier, receiver and so on, are optimized to process the lightwaves in M and $\lambda_4$. One of the best solutions to achieve the above requirements is to convert the wavelength from $\lambda_3$ and $\lambda_6$ to the wavelength $\lambda_1$ and $\lambda_4$ respectively before de-multiplexing the lightwaves by the optical demultiplexer. The wavelength converter shown in FIG. 6 enables us to realize the above wavelength conversion. Consequently, the problem can be resolved by setting the wavelength converter 50 shown in FIG. 6 to the optical cross connect as shown in FIG. 8.

Figure 9:
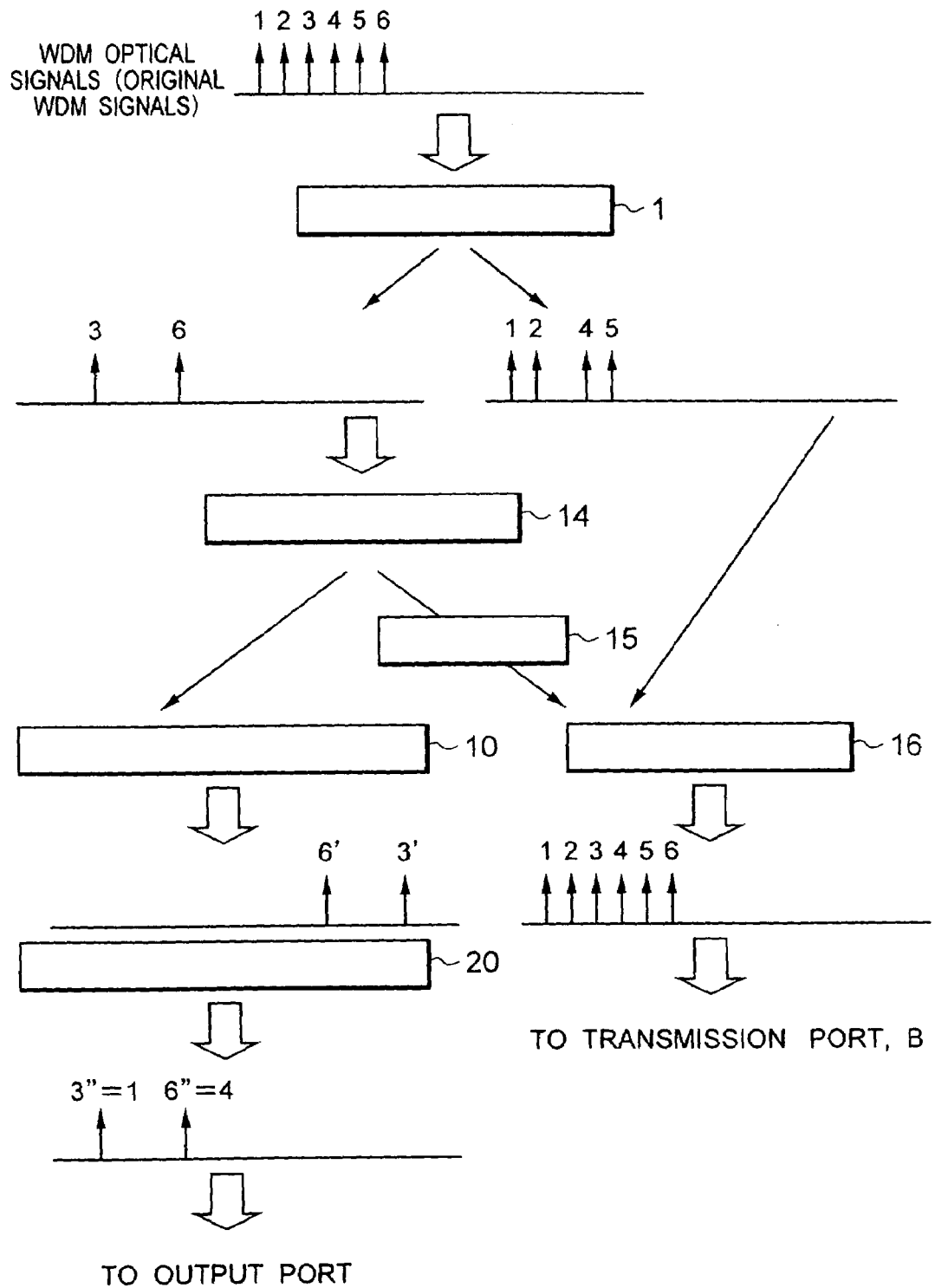
FIG. 9 is a view for explaining wavelength conversion procedures of lightwaves in the wavelength conversion shown in FIG. 6.

A function of the wavelength converter 50 shown in FIG. 6 will be described as follows with help of FIG. 9. A view for explaining wavelength conversion procedures of lightwaves in the wavelength converter is shown in FIG. 9. The six channels WDM lightwaves are launched into the input port 11. The launched lightwaves are filtered out by a Fabry-Perot etalon filter 1 in N=3 channels interval periodically. In FIG. 9, the third and sixth channels (corresponding to the wavelength $\lambda_3$ and $\lambda_6$) are filtered out. Namely the third information carried by the lightwave in $\lambda_3$ and the sixth information carried by the lightwave in $\lambda_6$ are both filtered out and outputted from the one output port of the filter 1. The remained lightwaves (ch. 1, ch. 2, ch. 4 and ch. 5) are outputted from the other output port. The lightwaves $\lambda_3$ and $\lambda_6$ (of course and the third and sixth information) are divided respectively by the optical divider 14.

Output lightwaves from the one port of the optical divider 14 is launched into an optical amplifier 15, and the amplified lightwaves and the remained lightwaves (ch. 1, ch. 2, ch. 4 and ch. 5) are multiplexed by an optical multiplexer 16. The WDM lightwaves obtained by the procedures are transmitted toward the transmission port 17 of the wavelength converter shown in FIG. 6. Lightwaves of the channel 3 and 6 outputted from the other end of the optical divider 14 are wavelength converted by the first multi-channels simultaneous wavelength conversion portion 10. As shown in FIG. 6, the first multi-channels simultaneous wavelength conversion portion 10 is composed of the optical combiner 3, pump light source 2 whose wavelength $\lambda_{p1}$ is longer than the $\lambda_6$, optical fiber 4 whose zero-dispersion wavelength is in the vicinity of $\lambda_{p1}$ and the optical filter 5 whose transmittance is large inside the longer wavelength region than $\lambda_{p1}$. The third and sixth information, each is carried by the lightwave of the wavelength $\lambda_3$ and $\lambda_6$, are wavelength converted to the lightwave of the wavelength $\lambda_3'$ and $\lambda_6'$ respectively without lack of the information. From the frequency phase-matching condition, the following relation is provided $$\frac{1}{\lambda_3'} = \frac{2}{\lambda_{p1}} - \frac{1}{\lambda_3} \qquad (2)$$
$$\frac{1}{\lambda_6'} = \frac{2}{\lambda_{p1}} - \frac{1}{\lambda_6}$$

The next procedure is the wavelength conversion from the wavelength converted lightwaves in wavelength $\lambda_3'$ and $\lambda_6'$ obtained by the first multi-channels simultaneous wavelength converter 10, to the wavelength $\lambda_1$ and $\lambda_4$ respectively by use of the second multi-channels simultaneous wavelength conversion portion 20. The frequency phase matching condition and the equations (2) require the following relations $$\frac{2}{\lambda_{p2}} = \frac{1}{\lambda_4} + \frac{1}{\lambda_6'} = \frac{1}{\lambda_4} + \left(\frac{2}{\lambda_{p1}} - \frac{1}{\lambda_6}\right) \qquad (3)$$

thus the pump light wavelength $\lambda_{p2}$ of the pump source 22 is determined by solving the equation with respect to $\lambda_{p2}$ and the result is $$\lambda_{p2} = \frac{2\lambda_{p1}\lambda_4\lambda_6}{\lambda_{p1}(\lambda_6 - \lambda_4) + 2\lambda_4\lambda_6} \qquad (4)$$

The second multi-channels simultaneous wavelength converter 20 is composed of a second optical combiner 21, a second pumping source 22 whose wavelength is $\lambda_{p2}$, a second optical fiber 23 whose zero-dispersion wavelength is in the vicinity of $\lambda_{p2}$, and a second optical filter 24 whose transmittance is large inside the longer wavelength region than $\lambda_{p2}$. Consequently, the third and sixth information, each is carried by the lightwave of the wavelength $\lambda_3$ and $\lambda_6$ the input port 11 of the wavelength converter 10 are wavelength converted to the lightwave of the wavelength $\lambda_1$ and $\lambda_4$ respectively and outputted from the output port of the optical combiner 27 without lack of the information.

Fifth Embodiment of Wavelength Converter

Figure 10:
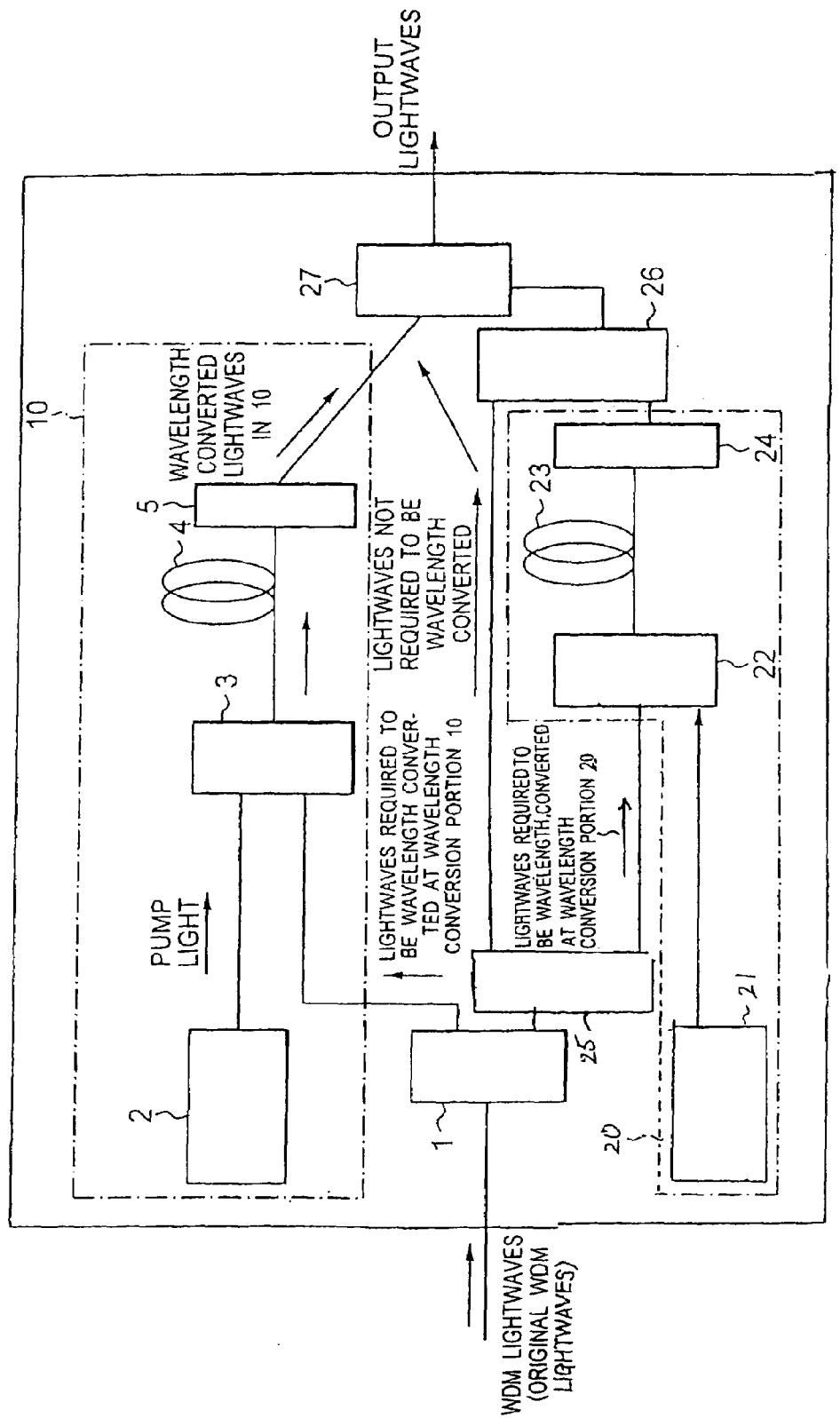
FIG. 10 is an explanatory schematic showing a wavelength converter according to a fifth embodiment of the present invention.
Figure 11:
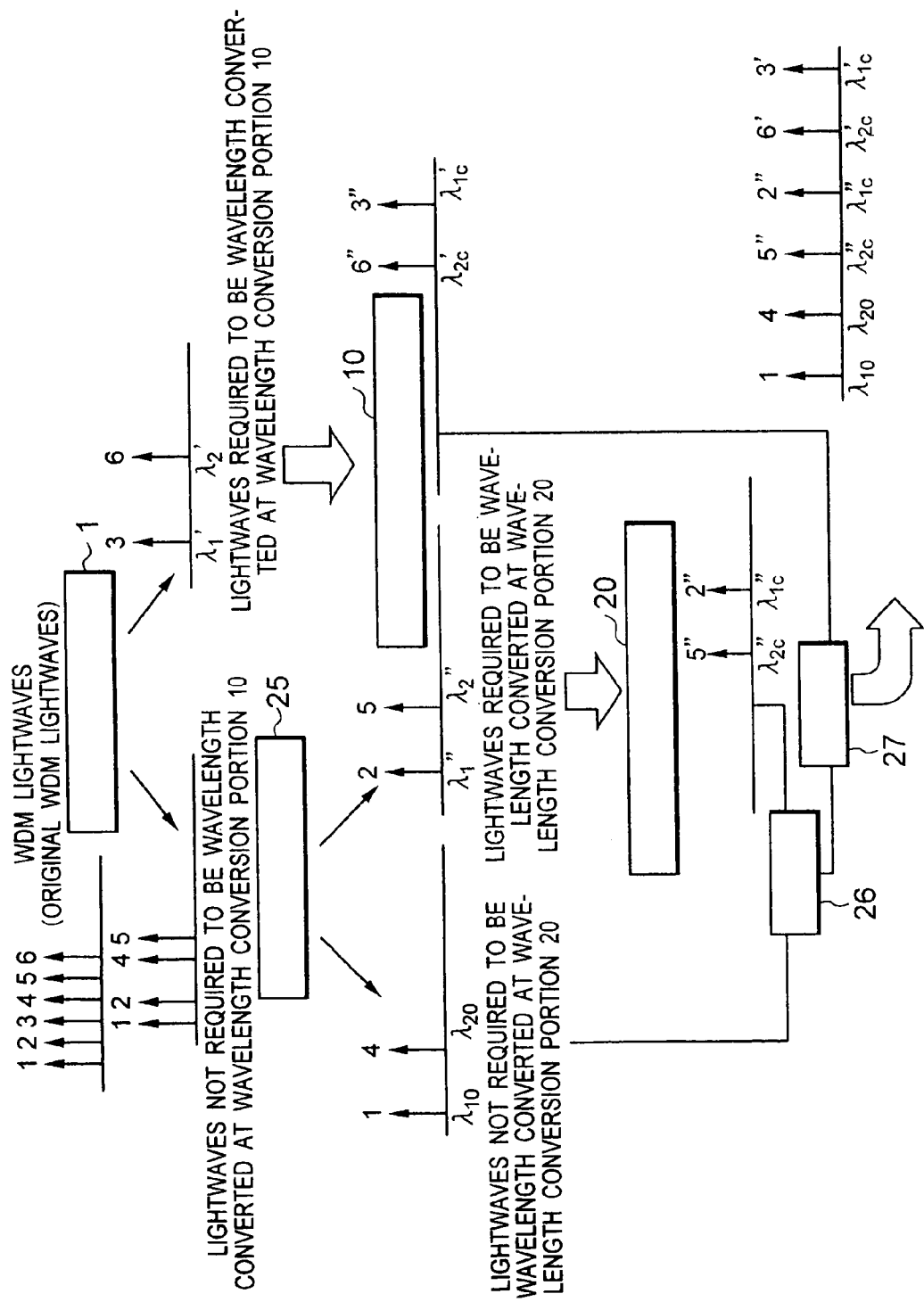
FIG. 11 is a view for explaining wavelength conversion procedures of lightwaves in the fifth wavelength conversion shown in FIG. 10.

A wavelength converter according to a fifth embodiment of the present invention will be explained with reference to FIGS. 10 and 11. This wavelength converter corresponds to the aforementioned fifth aspect of the present invention. FIG. 11 is a diagram for explaining wavelength conversion procedures of lightwaves in the fifth wavelength converter shown in FIG. 10. Two Fabry-Perot etalon filters which filters out the lightwaves periodically in each N=2 channels spacing (filters out in every three channels) in frequency domain are used. In the wavelength converter shown in FIG. 10, the input WDM lightwaves are launched into the first optical filter 1 and some of the input lightwaves are filtered out in N=2 channel spacing periodically in wavelength domain. The filtered out lightwaves are combined with pump light from the pump source 2 by an optical combiner 3 and the lightwaves outputted from the combiner 3 are launched into the optical fiber 4. Wavelength converted lightwaves are generated by the FWM in the fiber. Output lightwaves from the fiber 4 are launched into the optical filter 5 and solely the wavelength converted lightwaves are outputted. Consequently, the filtered out lightwaves from the optical filter 1 are wavelength converted in the first wavelength conversion portion 10. The remained lightwaves not to be filtered out by the optical filter 1 are launched into a second Fabry-Perot etalon filter 25. The etalon filter 25 has the specification almost similar with the optical filter 1 except the wavelength of the transmittance peak is shifted 1-channel frequency interval of the original WDM lightwaves. The lightwaves inputted to the etalon filter 25 is filtered out and the WDM lightwaves whose frequency interval corresponds to the 2-channels spacing of the original WDM lightwaves are outputted from the each two-output port of the filter 25. The filtered out lightwaves are combined with the pump light from the second pump source 21 by an optical combiner 22. Then the combined lightwaves are launched into the second optical fiber 23 and wavelength converted lightwaves are generated by FWM in the optical fiber 23. By virtue of the optical filter 24, solely the wavelength converted lightwaves are outputted. Resultantly the filtered out lightwaves from the optical filter 25 are simultaneously wavelength converted by the multi-channel simultaneous wavelength conversion portion 20. The remained lightwaves from the filter 25 not to be wavelength converted are combined with the wavelength converted lightwaves outputted from the multi-channels simultaneous wavelength conversion portion 20 by an optical combiner 26. The combined WDM lightwaves are further combined with the wavelength converted lightwaves outputted from the multi-channels simultaneous wavelength converter 10 by an optical wavelength combiner 27. Channel arrangement of the finally combined lightwaves outputted from the wavelength combiner 27 is reconfigured in comparison of the original WDM lightwaves in wavelength domain by the wavelength converter provided in this embodiment. As shown in FIG. 11, the reconfigured lightwaves, namely the outputted lightwaves from the wavelength converter is a WDM lightwaves whose frequency interval is three (3=N+1) times larger than that of the input WDM lightwaves to the wavelength converter. The wavelength converter shown in FIG. 10 (N=2) is an extended case of the second embodiment (N=1 case). As analogies of the extension, more general case, namely the case where N is an arbitrary integer, can be realized straightforwardly as follows. Assuming the channel number of the input (or original) WDM lightwaves is K composed of the lightwaves whose wavelength are $\lambda_1$, $\lambda_2$, ..., $\lambda_k$ and the frequency interval of the K-channel lightwaves are set to be $\Delta f$, the lightwaves at interval of N=i channels can be realized from the original WDM lightwaves by use of the two Fabry-Perot etalon filters that can filter out the original WDM lightwaves periodically with frequency spacing $\Delta f(i+-1$ channel interval). The WDM lightwaves with $i\Delta f$ frequency spacing can be realized by applying the two Fabry-Perot etalon filters to each optical filters of the first optical filter 1 and the second filter 25 shown in FIG. 10. Wavelengths of the lightwaves that are filtered out from the first Fabry-Perot etalon filter 1, are put to be $\lambda_1'$, $\lambda_2'$, $\lambda_3'$ ..., $\lambda_m'$, from the short wavelength side where m is an integer. The lightwaves will be launched into the multi-channels simultaneous wavelength conversion portion 10. Similarly, wavelengths of the lightwaves that are filtered out from the second Fabry-Perot etalon filter 25, are put to be $\lambda_1''$, $\lambda_2''$, $\lambda_3''$ ..., $\lambda_m''$, from the short wavelength side. The lightwaves will be launched into the multi-channels simultaneous wavelength conversion portion 20. Wavelengths of the lightwaves that are not filtered out from neither the first 1 nor the second Fabry-Perot etalon filter 25, are put to be $\lambda_{10}''$, $\lambda_{20}''$, $\lambda_{30}''$ ..., $\lambda_{m0}''$, from the short wavelength side. The lightwaves will be combined with the wavelength converted lightwaves outputted from the wavelength conversion portion 20 by an optical combiner 26. Setting the wavelength of the first pump light to be $$\lambda_{p1} = 2\left(\frac{\lambda_m' \lambda_{mc}'}{\lambda_m' + \lambda_{mc}'}\right), \quad (5)$$

the lightwaves whose wavelength are $\lambda_1'$, $\lambda_2'$, ... $\lambda_m'$ are wavelength converted to the wavelength $\lambda_{1C}'$, $\lambda_{2C}'$, $\lambda_3'$ ..., $\lambda_{mC}'$. Concerning the second pump light from the second pump source 21, lightwaves whose wavelength are $\lambda_1''$, $\lambda_2''$ ..., $\lambda_m''$ are wavelength converted to the wavelength $\lambda_{1C}''$, $\lambda_{2C}''$, $\lambda_3''$ ..., $\lambda_{mC}''$ under the condition that the wavelength $\lambda_{mC}''$ satisfies the inequality $\lambda_{1C}' < \lambda_{mC}''$. In this case the wavelength of the second pump $\lambda_{mC}''$ can be determined from the frequency phase-matching condition and is represented as $$\lambda_{p2} = 2\left(\frac{\lambda_m'' \lambda_{mc}''}{\lambda_m'' + \lambda_{mc}''}\right) \quad (6)$$

As shown in FIG. 11, the frequency spacing of the original WDM lightwaves can be broadened by three (=N+1) times by choosing the wavelength of the pump source 2 and 21 according to the equation (5) and (6) respectively.

Sixth Embodiment of Wavelength Converter

Figure 12:
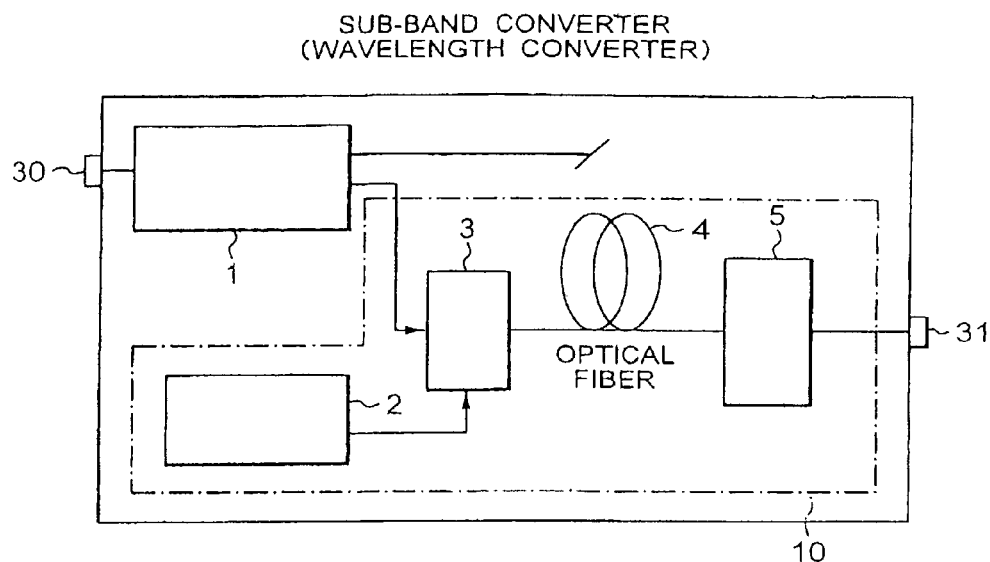
FIG. 12 is an explanatory schematic showing a wavelength converter according to a sixth embodiment of the present invention.
Figure 13:
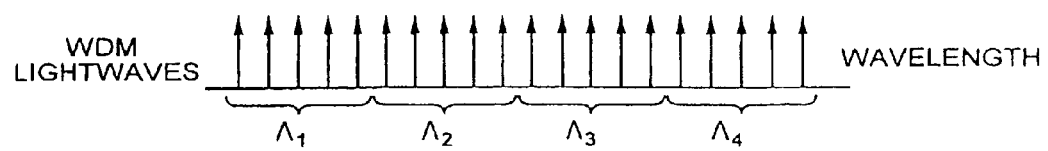
FIG. 13 is a conceptual schematic to explain sub-band.
Figure 14:
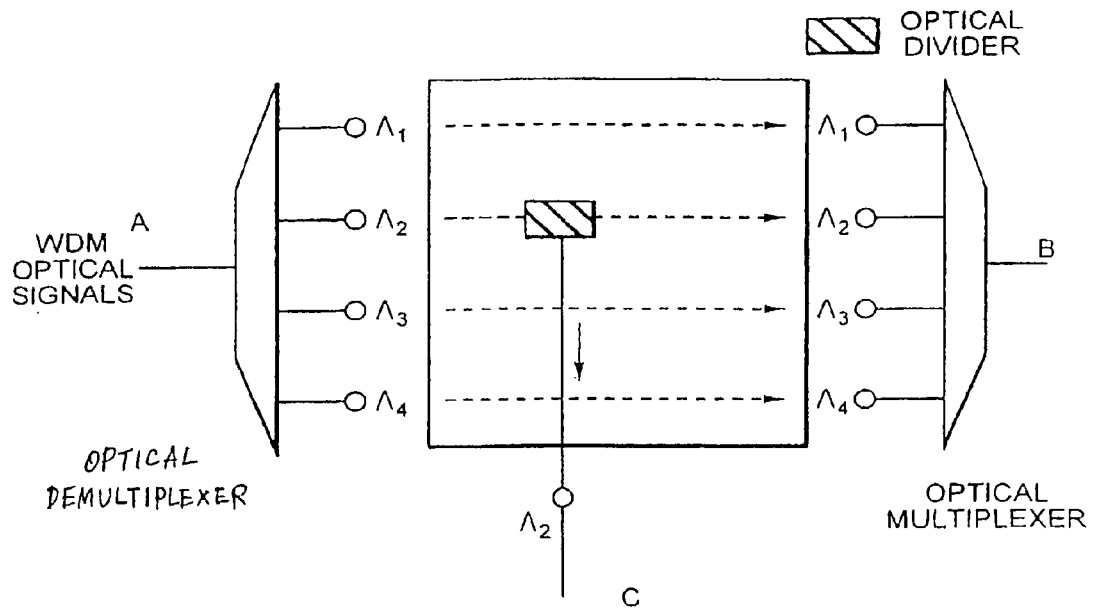
FIG. 14 is an explanatory view showing an example of optical cross connect using WDM lightwaves.
Figure 15:
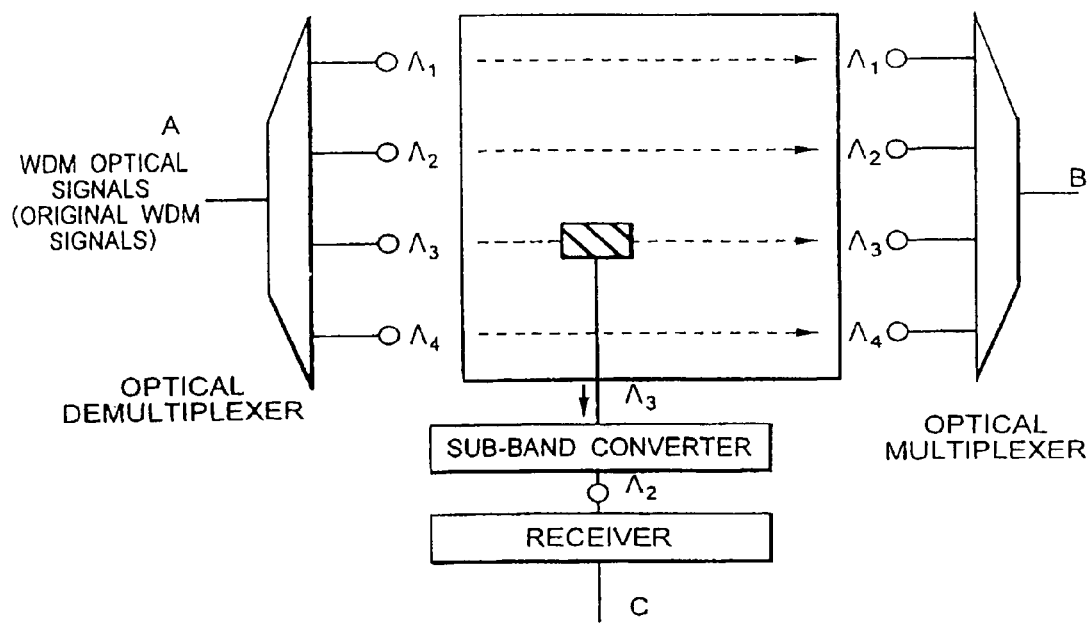
FIG. 15 is a view for explaining a case where the wavelength converter shown in FIG. 12 is added to enhance the flexibility of the optical cross connects shown in FIG. 14.

A wavelength converter according to a sixth embodiment of the present invention will be explained. This wavelength converter corresponds to the aforementioned sixth aspect of the present invention. FIG. 12 is a schematic of the wavelength converter, hereafter referred as the "sub-band converter". FIG. 13 is a conceptual schematic to explain the sub-band that is the fundamental concept to explain the present invention. In FIG. 13, 20-channels WDM lightwaves are schematically represented. At present, more than 128 channels of the WDM transmission experiments were demonstrated. Concerning the signal processing of such an extraordinarily number of the channels, the difficulties of the system management increase monotonically as the channel number increases. To resolve the difficulties sub-band management is considered as follows. Concept of the sub-band management is explained by use of an example of the 20-channels of the WDM lightwaves shown in FIG. 13. According to the sub-band management technique, all the WDM lightwaves are divided into finite number of small groups in wavelength domain (or equivalently in frequency domain). In FIG. 13, 20 WDM signals are divided into four-groups. Each group is composed of five channels of the lightwaves. Of course in general, it is not necessary to divide all the WDM channels equivalently. As an analogy of referring the each lightwave channels by use of its wavelength $\lambda_j$ (j=1, 2, ..., 20), index of the sub-band is referred as $\Lambda_k$ (k=1, 2, 3, 4) in this document. Schematic of an example of the optical cross connect using the sub-band is shown in FIG. 14. In the figure, WDM lightwaves are transmitted in the direction from A to B. The WDM lightwaves and therefore the information carried by the lightwaves in sub-band $\Lambda_2$ is divided by an optical divider and dropped in the direction to C. On the practical point of the system management, the following situation can be conceived that the information carried by the sub-band $\Lambda_2$ is desired to be changed to the information carried by the sub-band $\Lambda_3$, and transmit to the direction C instead of the information carried by the sub-band $\Lambda_2$. However, since the system design of the direction C is optimized for processing the WDM lightwaves in sub-band $\Lambda_2$, the above change could not be realized straightforwardly e.g., only by changing the arrangement of the optical divider from the line of $\Lambda_2$ to the line of $\Lambda_3$. The system optimized in sub-band $\Lambda_2$ implies that the optical divider is optimized to drop the lightwaves to the direction C for processing the wavelength $\lambda_{2S}$, $\lambda_{21}$, ... $\lambda_{2L}$ (2S=5, 21=6, ..., 2L=8 in FIG. 13), the optical receiver, demultiplexer and so on, are also optimized to treat the wavelength inside the sub-band $\Lambda_2$. The problem is essentially equivalent to the fourth-embodiment of the present invention and is solved solely replacing the channel wavelength converter to the sub-band converter. The sub-band converter changes the wavelength of the sub-band from $\Lambda_2$ to $\Lambda_3$, or equivalently wavelength of the lightwaves $\lambda_{2S}$, $\lambda_{21}$, ... $\lambda_{2L}$ to the $\lambda_{3L}$, ... $\lambda_{31}$, $\lambda_{3S}$. Inserting the sub-band converter into the system shown as in FIG. 15, and changing the optical divider position from the line of $\Lambda_2$ to the line of $\Lambda_3$, the problem can be resolved. The optical divider set at the line of $\Lambda_3$ should be optimized to process the lightwaves inside the side-band $\Lambda_3$.

Figure 16:
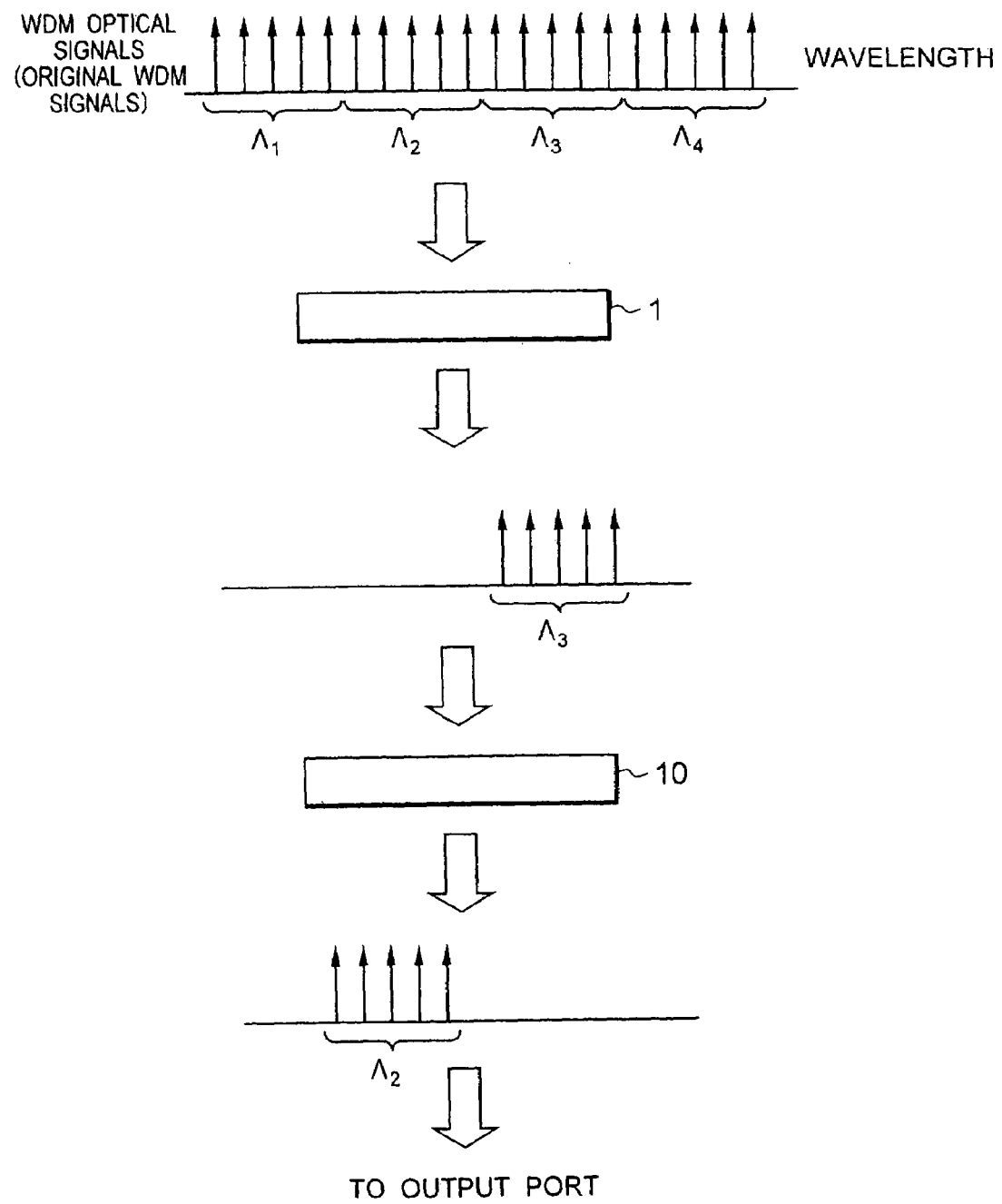
FIG. 16 is a view for explaining sub-band conversion procedures.

Schematic of the sub-band converter is shown in FIG. 12 and the diagram for explaining wavelength conversion procedures of lightwaves is shown in FIG. 16. All twenty channels of the WDM lightwaves are launched into the input port 30 in FIG. 12. Solely sub-band $\Lambda_3$ is filtered out from the input WDM lightwaves by a dielectric multi-layered filter 1 whose transmittance peak covers whole of the wavelength region $\Lambda_3$ in the wavelength domain. The filtered out lightwaves (lightwaves inside the sub-band AB) are combined with pump light from a pump source 2 by an optical combiner 3. The combined lightwaves are launched into the optical fiber 4 and wavelength converted lightwaves are generated by the FWM in the optical fiber 4. The information carried by the lightwaves of the sub-band $\Lambda_3$ at the input end of the sub-band converter, are carried by the lightwaves in sub-band $\Lambda_2$ after the sub-band converter by virtue of the sub-band wavelength conversion. Putting the longest wavelength of the lightwaves inside the sub-band $\Lambda_2$ as $\lambda_{2L}$ and also the shortest wavelength of the lightwaves inside the sub-band $\Lambda_3$ as $\Lambda_3 S$, the wavelength of the pump source 2 is determined as $$\lambda_p = \frac{2\lambda_{2L}\lambda_{3S}}{\lambda_{2L} + \lambda_{3S}} \quad (7)$$

The sub-band converter is composed of the pump source 2 whose wavelength is coincided with the value of equation (7), an optical fiber 4 whose zero-dispersion wavelength is in the vicinity of the value provided in equation (7), dielectric multi-layered filter 1 whose transmittance peak is coincided with the wavelength inside the sub-band $\Lambda_3$ in the wavelength domain and an optical filter 5 whose transmittance peak is coincided with all the wavelength inside the sub-band $\Lambda_2$ in the wavelength domain. The peak transmittance value is much larger than the transmittance value at the sub-band $\Lambda_2$ in the wavelength domain. The output lightwaves from the optical filter 5 are outputted from the output port 31. The sub-band converter enables to transfer the information carried by sub-band $\Lambda_3$ at point A in FIG. 15 to the direction C by changing the wavelength of the lightwaves to be coincided with inside the sub-band $\Lambda_2$.

Seventh Embodiment of Wavelength Converter

Figure 17:
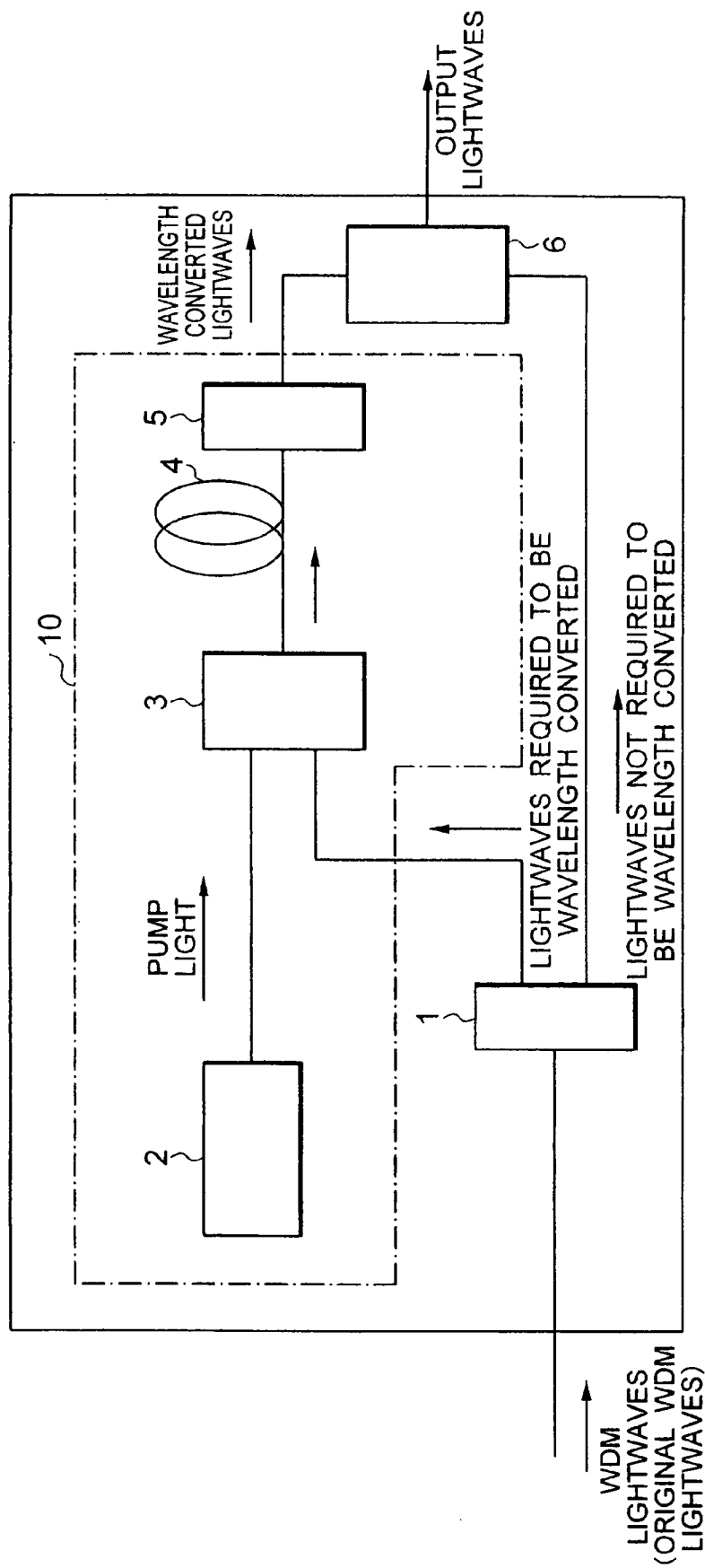
FIG. 17 is an explanatory schematic showing a wavelength converter according to a seventh embodiment of the present invention.
Figure 18:
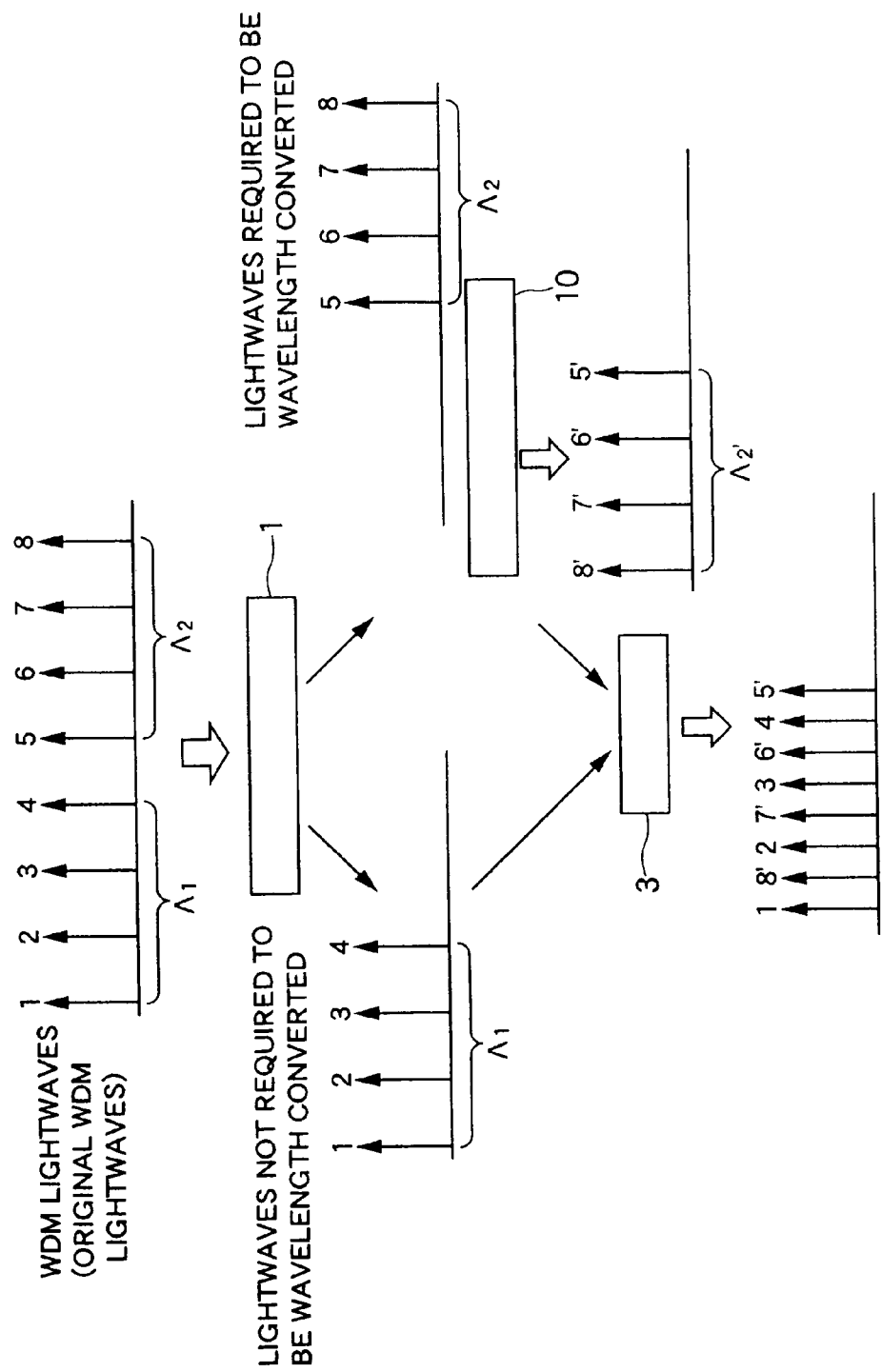
FIG. 18 is a view for explaining wavelength conversion procedures of lightwaves in the seventh wavelength converter shown in FIG. 17.

A wavelength converter according to a seventh embodiment of the present invention will be explained. This wavelength converter corresponds to the aforementioned seventh aspect of the present invention. FIG. 18 is a diagram for explaining wavelength conversion procedures of lightwaves in the wavelength converter shown in FIG. 17. On the contrary of the embodiments 2, 4 and 5, the embodiment allows to output the WDM lightwaves whose channel interval is narrower than the input WDM lightwaves. In FIG. 7, dielectric multi-layered filter is adopted as the optical filter 1. By using the dielectric multi-layered filter 1, sub-band $\Lambda_2$ shown in FIG. 18 can be filtered out. Frequency interval of the WDM lightwaves shown in FIG. 8 is constant. In FIG. 17, lightwaves in the sub-band $\Lambda_2$ are filtered out from the input WDM lightwaves shown in FIG. 18 by a dielectric multi-layered filter 1. The filtered out lightwaves inside the sub-band $\Lambda_2$ is combined with the pump light from the pump source 2 by an optical combiner 3. The combined lightwaves are launched into the optical fiber 4 and wavelength converted lightwaves inside the sub-band $\Lambda_2'$ are generated by FWM in the fiber 4. Solely the sub-band $\Lambda_2'$ is filtered out by an optical filter 5.

In FIG. 18, by using an optical combiner 6, wavelength converted lightwaves inside the sub-band $\Lambda_2'$ outputted from the optical filter 5, are interleaved between the each channel of the lightwaves inside the sub-band $\Lambda_1$ which were not filtered out from the dielectric multi-layered filter 1. Thus frequency interval of the output WDM lightwaves is half of the input WDM lightwaves. The technique is applicable to make full use of the transmission capacity of the optical fibers in the following sense. Concerning the cross connect between the two different transmission lines. One is composed of a kind of optical fiber capable to realize higher-spectral efficiency that is little influenced by inter-channel crosstalk than the other transmission line composed of the other type of the fiber. Here the former is referred as the high-quality line and the latter is referred as the low-quality line. In the case of transmitting the WDM signals from the low-quality line to the high-quality line, if the WDM signals are transferred directly, the advantage of the high-quality line is wasted. The wavelength converter provided in the embodiment enables to convert the WDM signals from the low-spectral efficiency to the high-spectral efficiency. Thus using the wavelength converter before transferring the WDM signals from the low-quality line to the high-quality line, the advantage of the high-quality line can be used more efficiently in comparison of the above directly transferring method.

Wavelength of the pump light $\lambda_p$ from the pump source 2 shown in FIG. 17, must be satisfied with the following condition:

$$\lambda_4 < \lambda_p < \lambda_5$$

To reduce the frequency interval to be ½ of the input signals frequency interval, $\lambda_p$ is provided from the phase matching condition $$\lambda_p = \frac{4\lambda_3\lambda_4\lambda_5}{2\lambda_3\lambda_4 + \lambda_5(3\lambda_3 - \lambda_4)}$$

Eighth Embodiment of Wavelength Converter

Figure 19:
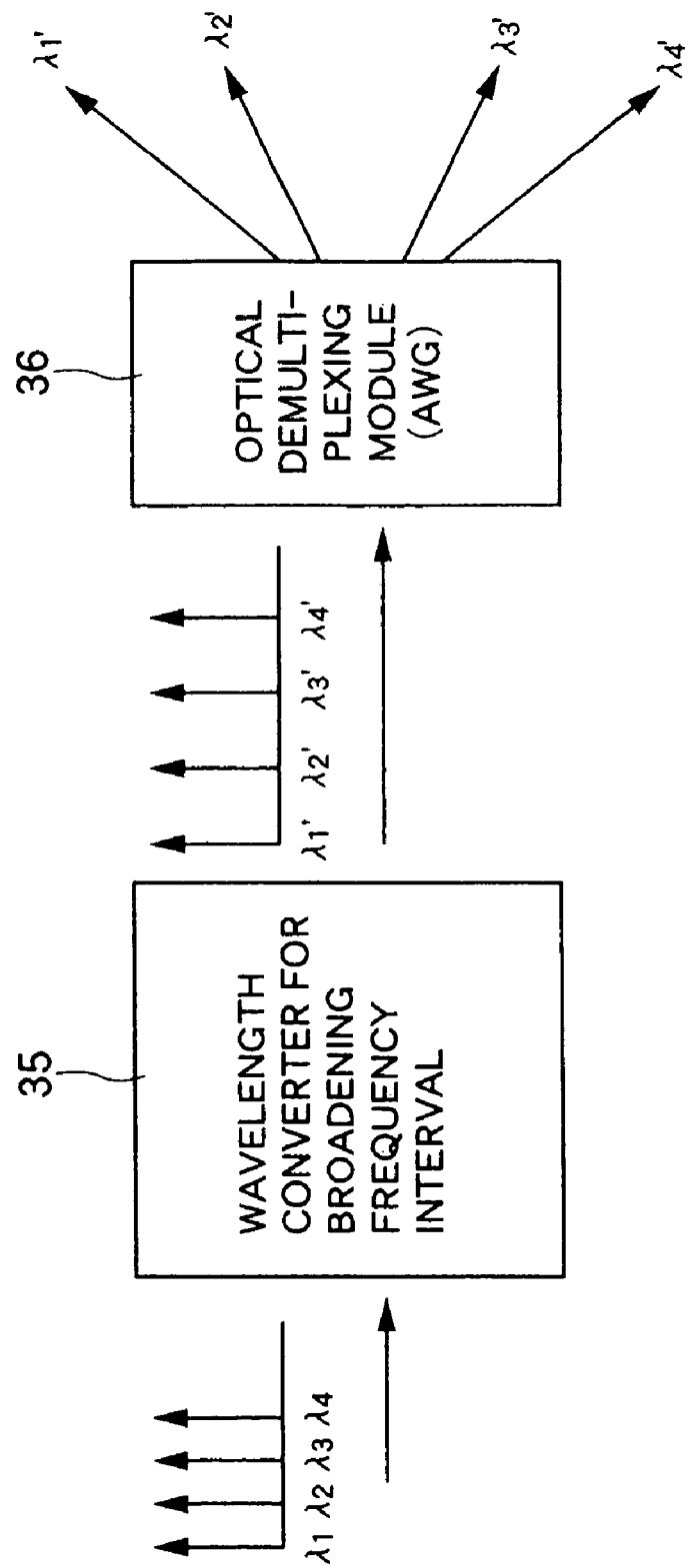
FIG. 19 is an explanatory view of the optical de-multiplexing method in a wavelength converter according to an eighth embodiment of the present invention.

FIG. 19 shows an optical demultiplexing module according to an eighth embodiment of the present invention. The optical demultiplexing module corresponds to the aforementioned eighth aspect of the present invention. The optical de-multiplexing module is composed of the wavelength converter 35 that can broaden the frequency interval of the input lightwaves (as described in the second and fifth embodiments), and an optical demultiplexer 36. An arrayed waveguide grating (AWG) is one of the examples of such an optical demultiplexer. Typical extinction ratio of AWG is known to be 16 dB at frequency interval 27 GHz. It is known that the extinction ratio can be increased as the frequency interval becomes large in generally. The wavelength converter 35 is applicable to enhance the extinction ratio of the AWG 36 by concatenating with the optical demultiplexer 36. According to the FIG. 19, the frequency interval of the input lightwaves is broadened by the wavelength converter 35. Thus the extinction ratio of the AWG 36 concatenated with after the wavelength converter 35 is enhanced. The optical demultiplexer concatenated with the wavelength converter 35 becomes an optical demultiplexing module with low crosstalk.

Ninth Embodiment of Wavelength Converter

Figure 20:
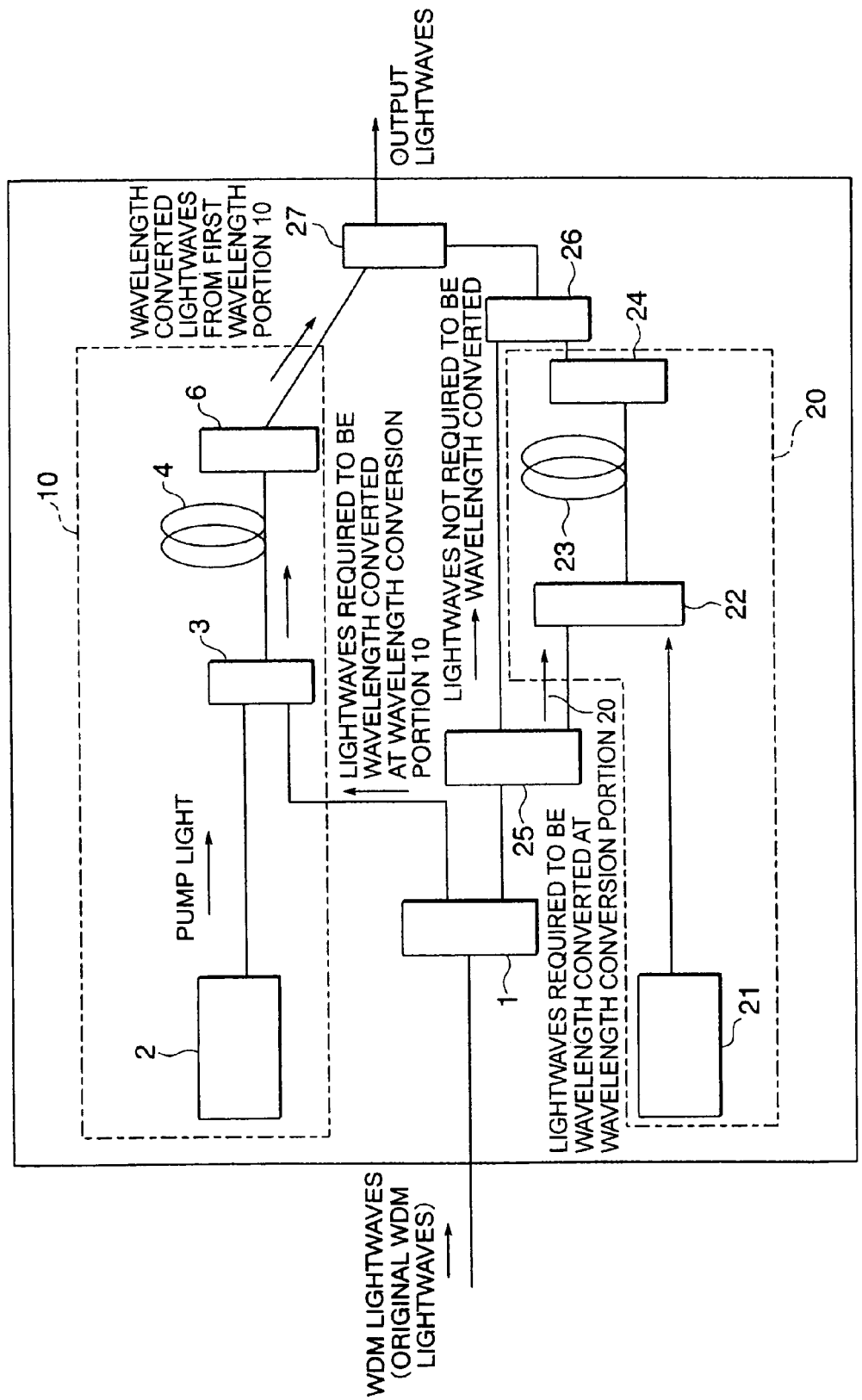
FIG. 20 is an explanatory view showing the wavelength converter according to the eighth embodiment of the present invention.
Figure 21:
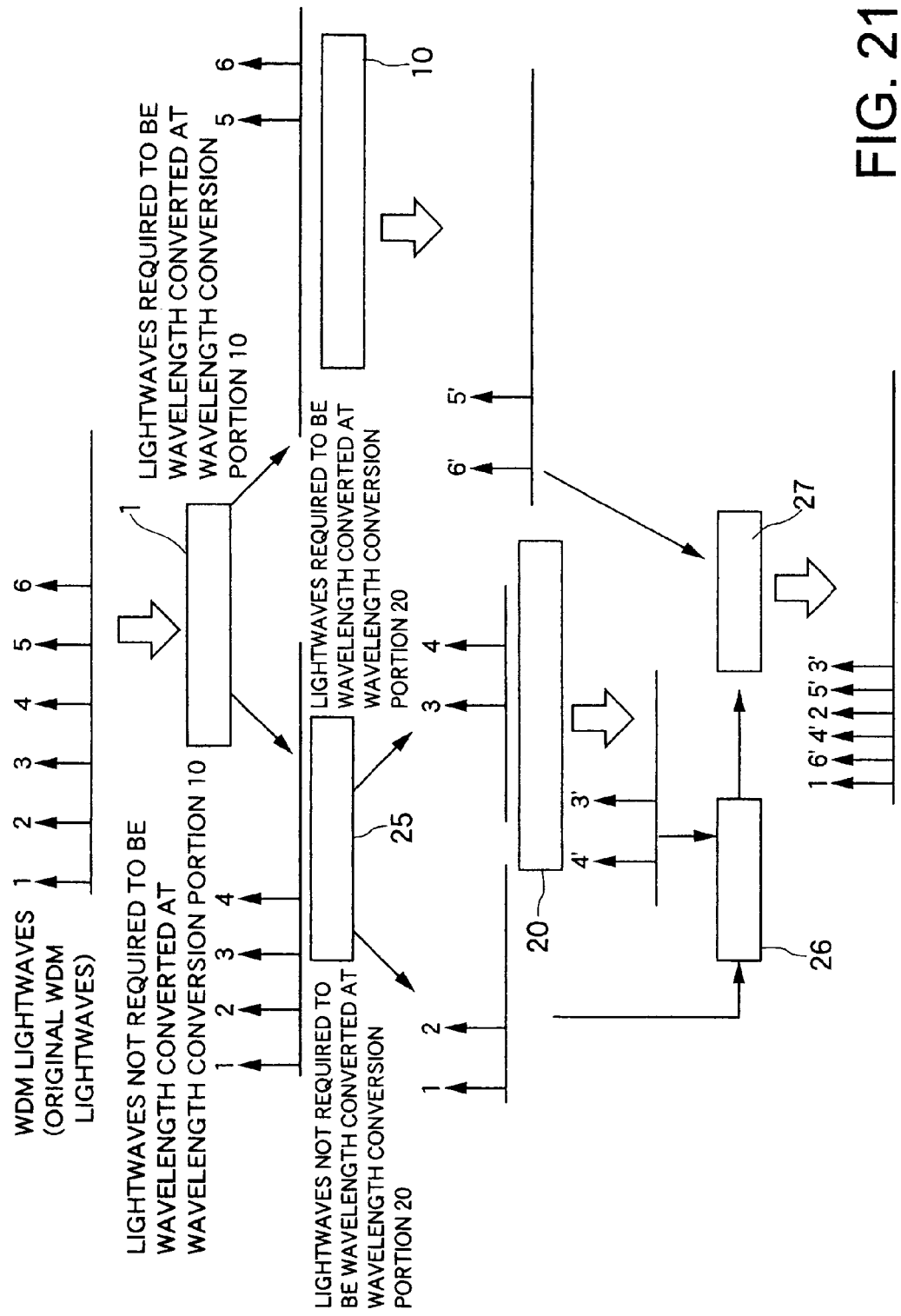
FIG. 21 is a view for explaining wavelength conversion procedures of lightwaves in the eighth wavelength converter shown in FIG. 20.

FIG. 20 shows a wavelength converter according to a ninth embodiment of the present invention. The wavelength converter provides another application of the aforementioned seventh aspect of the present invention. FIG. 21 is a view for explaining wavelength conversion procedures of lightwaves in the wavelength converter shown in FIG. 20. Both the wavelength conversion portion 10 and 20 shown in FIG. 20 can expand the frequency interval of the WDM lightwaves inputted to the each portion as described in the second and fifth embodiments of the present invention. In general, the frequency interval expansion ratio can be realized to be 1/(n+1) for an arbitrary positive integer n by applying the technique shown in the fifth embodiment discussed as follows.

The first optical filter 1 is a dielectric multi-layered filter. The first lightwaves required to be wavelength converted are filtered out from the optical filter 1. The first lightwaves required to be wavelength converted are combined with the pump light from the pump source 2 by an optical combiner 3. The combined lightwaves are launched into an optical fiber 4. The first wavelength converted lightwaves are generated by FWM in optical fiber 4. Only the first wavelength converted lightwaves are filtered out from the output lightwaves from the optical fiber 4 by an optical filter 6.

The lightwaves not to be filtered out by the first dielectric multi-layered filter 1 are launched into the second dielectric multi-layered filter 25. Second lightwaves required to be wavelength converted are filtered out by the filter 25 and combined with pump light from the pump source 21 by an optical combiner 22. The combined lightwaves outputted from the optical combiner 22 are launched into an optical fiber 23 and wavelength converted lightwaves are generated by FWM in the fiber 23. Solely the second wavelength converted lightwaves can be filtered out from the output lightwaves from the fiber 23 by use of the optical filter 24. The second wavelength converted lightwaves are combined with the lightwaves not required to be secondly wavelength converted by the wavelength conversion portion 20, by an optical combiner 26. Then the combined WDM lightwaves outputted from the optical combiner 26 are further combined with the first wavelength converted lightwaves output from the optical filter 6 by an optical combiner 27 in FIG. 20.

A technique to reduce the frequency interval of the WDM lightwaves that were launched into the wavelength converter (hereafter referred as the original lightwaves in this embodiment) is conceived in the following discussions. It will be provided that the resultant frequency interval becomes 1/(n+1), where n is an arbitrary natural number. Putting the wavelength of the lightwaves required to be wavelength converted in the first wavelength conversion portion 10 as, $\lambda_{m+1}, \lambda_{m+2}, \ldots \lambda_m$ and the wavelength of the lightwaves required to be wavelength converted in the second wavelength conversion portion 20 as $\lambda_{S+1}, \lambda_{S+2}, \ldots \lambda_m$ the integers m, M and S corresponding to the diagram shown in FIG. 21 are m=4, M=6 and S=2 respectively. In this time, the output WDM lightwaves from the wavelength converter whose frequency interval is ⅓ can be realized by setting the wavelength of the pump light of the pump source 2 ($\lambda_{p1}$) and pump source 21 ($\lambda_{p1}$) respectively as follows $$\lambda_{p1} = \frac{6\lambda_1\lambda_2\lambda_M}{2\lambda_1\lambda_2 + \lambda_M(3\lambda_1 + \lambda_2)} \tag{9}$$

$$\lambda_{p2} = \frac{6\lambda_1\lambda_2\lambda_m}{2\lambda_1\lambda_2 + \lambda_m(3\lambda_1 + \lambda_2)} \tag{10}$$

The result can be extended to more general case (equivalently arbitrary positive integer n) straightforwardly.

Tenth Embodiment of Wavelength Converter

Figure 22:
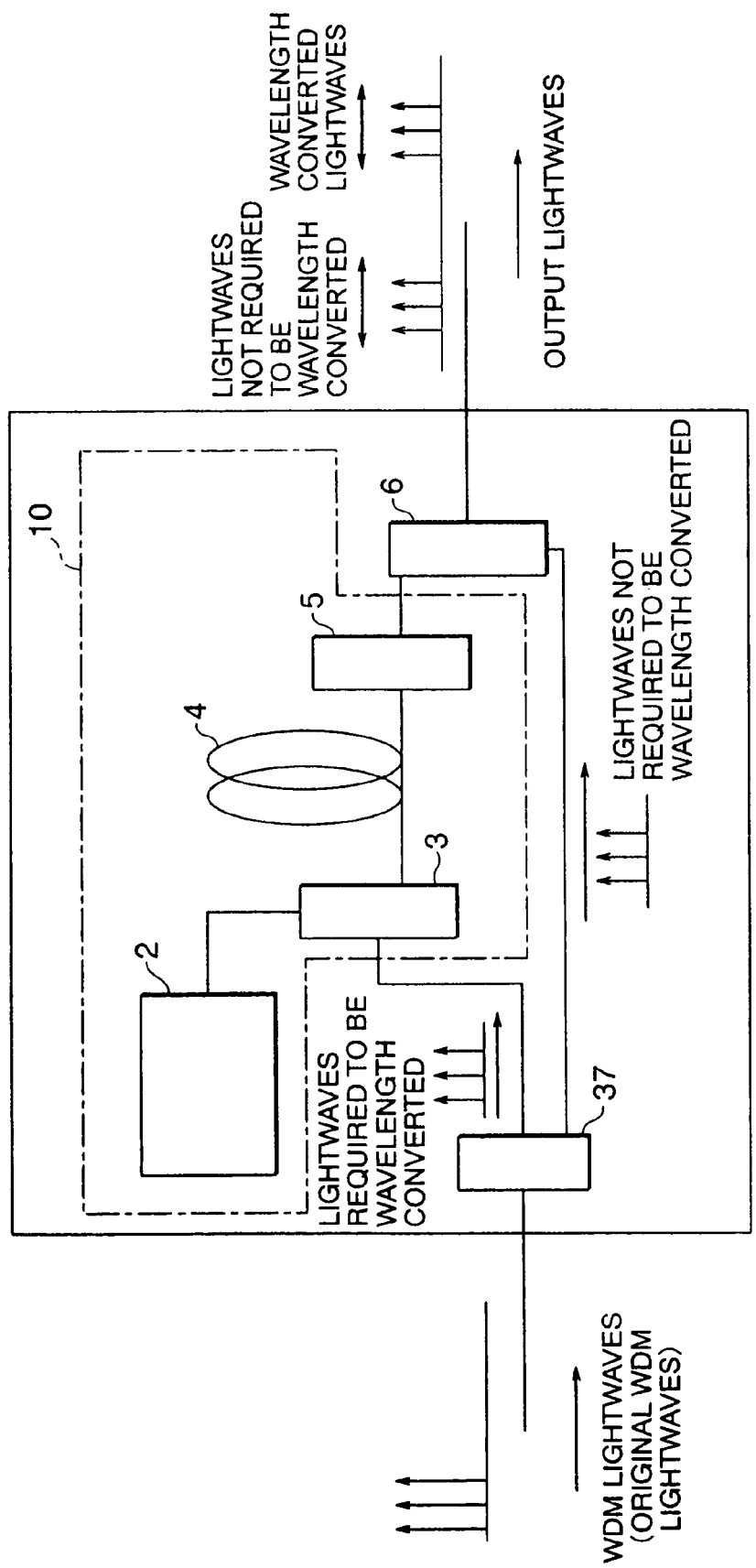
FIG. 22 is an explanatory view showing the wavelength converter according to the ninth embodiment of the present invention.

FIG. 22 shows a wavelength converter according to a tenth embodiment of the present invention. The wavelength converter corresponds to the aforementioned ninth aspect of the present invention. In FIG. 22, a broadband mulch-channel simultaneous wavelength conversion portion 10 is composed of a pump source 2, an optical combiner 3, an optical fiber 4 for generating the FWM and an optical filter 5. The optical fiber 4 can be replaced to be an SOA.

Figure 23:
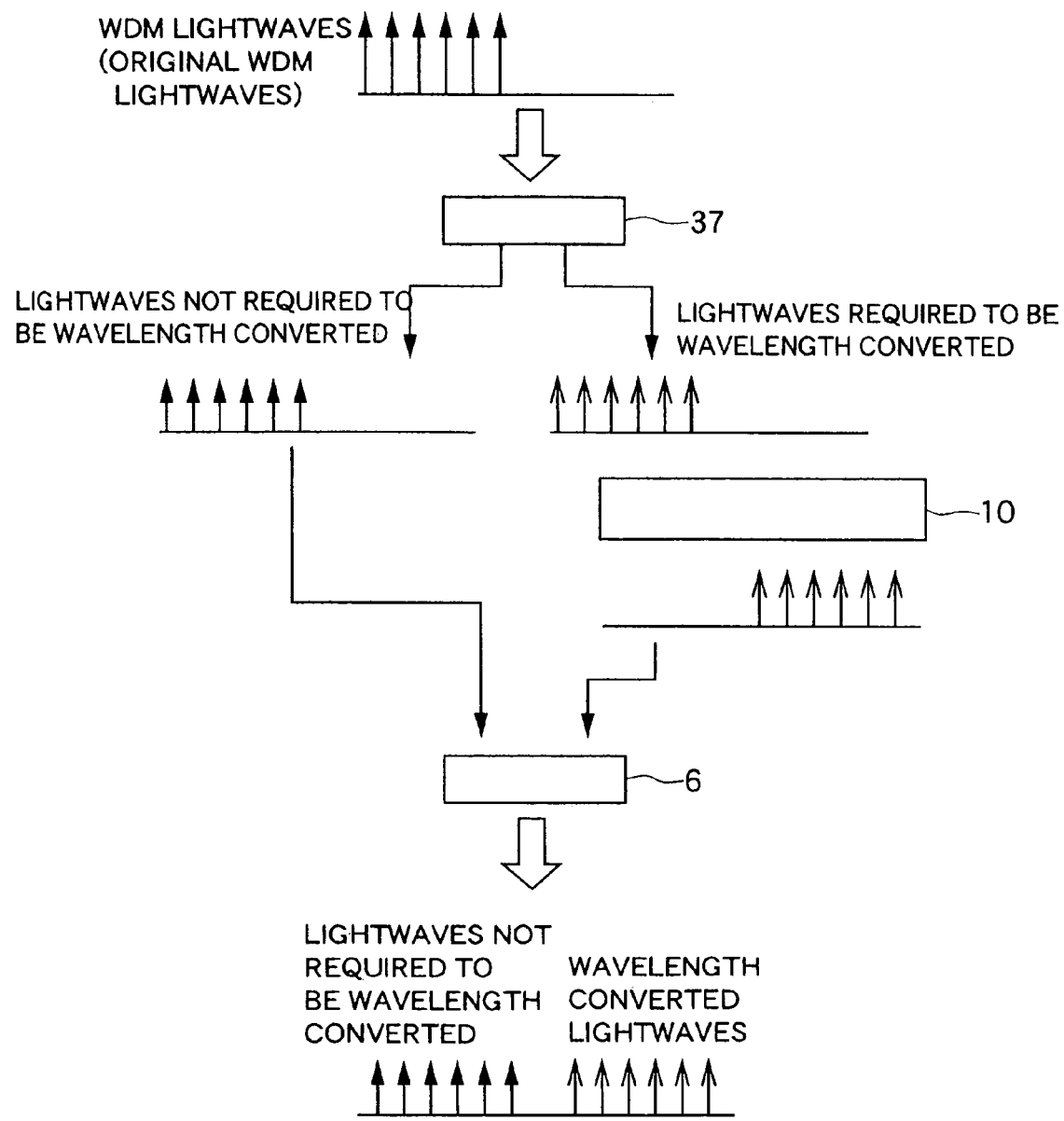
FIG. 23 is a view for explaining wavelength conversion procedures of lightwaves in the ninth wavelength converter shown in FIG. 22.

FIG. 23 is a view for explaining wavelength conversion procedures of lightwaves in the wavelength converter shown in FIG. 22. Frequency interval of the WDM lightwaves inputted to the wavelength converter is constant. The input WDM optical lightwaves are divided into two by an optical divider 37. One of the divided WDM lightwaves is the lightwaves required to be wavelength converted and is combined with a pump light from the pump source 2 by an optical combiner 3. The combined lightwaves outputted from the optical combiner 3 are launched into the optical fiber 4 and wavelength converted lightwaves are generated by FWM. Solely the wavelength converted lightwaves are filtered out from the output lightwaves from the optical fiber 4 by the optical filter 5. Consequently, the lightwaves required to be wavelength converted that is outputted from the optical divider 37 are wavelength converted by the broadband multi-channels simultaneous wavelength conversion portion 10. Lightwaves not required to be wavelength converted are outputted from the other port of the optical divider 37 and are combined with the wavelength converted lightwaves from optical filter 5 by the optical combiner 6 without duplication in wavelength domain. The combined lightwaves are outputted from the wavelength converter. Then we can increase the channel numbers twice in comparison of the original WDM lightwaves.

Y channel WDM optical lightwaves (Y is an arbitrary positive integer) are considered as the input WDM lightwaves (referred as the original WDM lightwaves). The wavelength of the Y-th lightwave which is a constituent of the original WDM lightwaves is put to be $\lambda_Y$ and $\lambda_Y$ is the longest wavelength of the original WDM lightwaves. Based on the FWM based wavelength conversion, the WDM lightwaves composed of the lightwaves whose wavelength are $\lambda_1, \lambda_2, \ldots, \lambda_Y$, are wavelength converted to the lightwaves whose wavelength are $\lambda_Y', \lambda_{Y-1}', \ldots, \lambda_1'$. Thus the wavelength $\lambda_Y'$ is the shortest wavelength among the wavelength converted lightwaves. Wavelength of the pump light is determined by the frequency phase-matching condition and is represented as $$\lambda_p = 2\left(\frac{\lambda_Y\lambda_Y'}{\lambda_Y + \lambda_Y'}\right), \tag{11}$$

The condition and the propagation constant phase-matching condition imply that the zero-dispersion wavelength of the optical fiber 4 is in the vicinity of the $\lambda_p$.

Eleventh Embodiment of Wavelength Converter

Figure 24:
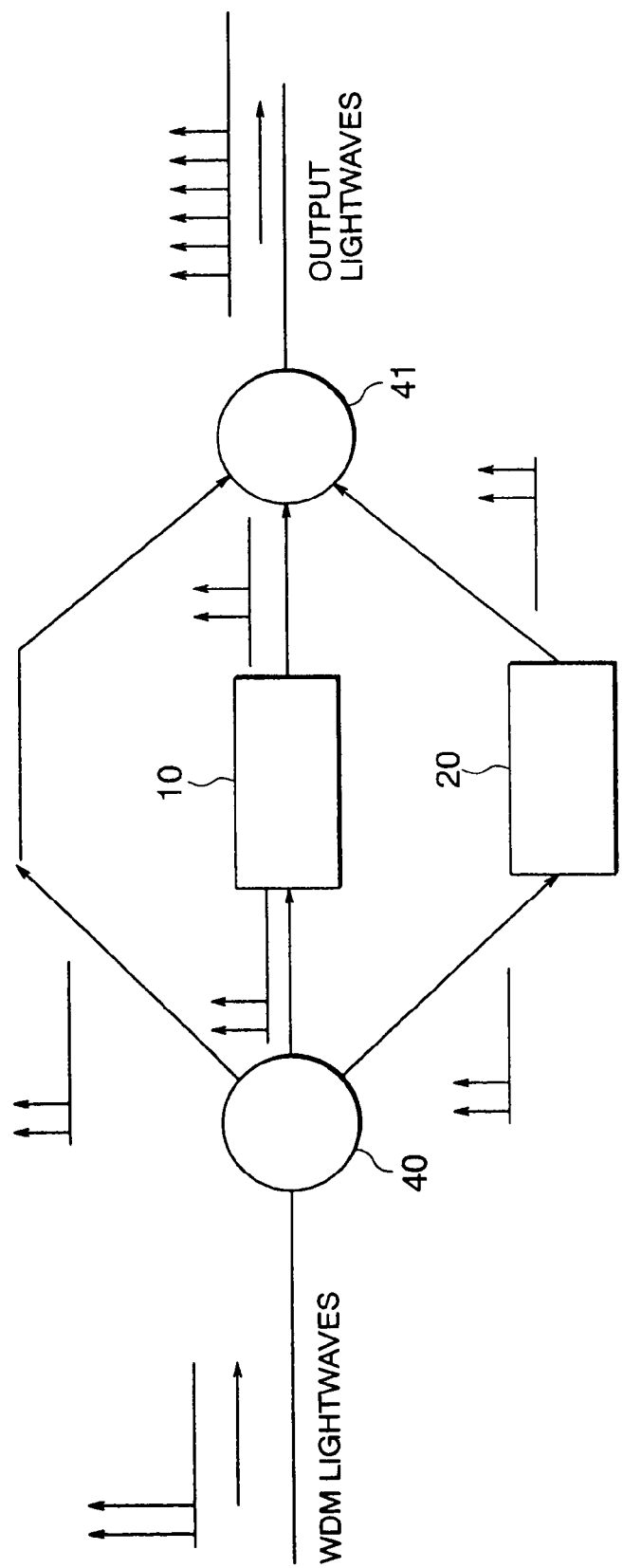
FIG. 24 is an explanatory view showing the wavelength converter according to the tenth embodiment of the present invention.

FIG. 24 shows a wavelength converter according to an eleventh embodiment of the present invention. The wavelength converter corresponds to the aforementioned ninth to eleventh aspect of the present invention. The wavelength converter appeared in FIG. 24 is an example of the applications of the tenth embodiment. Concerning the WDM lightwaves inputted to the optical divider 40 (referred to be the original WDM lightwaves hereafter in this embodiment), wavelength of the lightwaves are put to be $\lambda_1, \lambda_2, \ldots, \lambda_Y$, where Y is a positive integer. In this wavelength converter, the original WDM lightwaves are divided into three using e.g., an optical star-coupler. The divided lightwaves outputted from the first output port of the optical divider 40 is the WDM lightwaves not required to be wavelength converted. Output lightwaves from the remained port (the second and the third output port of the optical divider 40) are both the WDM lightwaves required to be wavelength converted. The lightwaves are wavelength converted by the broadband multi-channels simultaneously wavelength conversion portion 10 and 20 respectively. Both the wavelength converted lightwaves outputted from the wavelength conversion portion 10 and 20 are combined with the WDM lightwaves outputted from the first output port of the optical divider 40 by an optical combiner 41.

In this case, wavelength of the original WDM lightwaves are put to be $\lambda_1, \lambda_2, \ldots, \lambda_Y$ where Y is a positive integer. Then putting the wavelength of the wavelengths converted lightwaves outputted from the first broadband multi-channels wavelength conversion portion 10 wavelength as $\lambda_Y'$, $\lambda_{Y-1}', \ldots, \lambda_1'$ the wavelength $\lambda_Y'$ is the shortest in all of the first wavelength converted lightwaves. Similarly, putting the wavelength of the wavelength converted lightwaves outputted from the second broadband multi-channels wavelength conversion portion 20 wavelength as $\lambda_Y'', \lambda_{Y-1}'', \ldots, \lambda_1''$, the wavelength $\lambda_1''$ is the shortest in all of the second wavelength converted lightwaves. It is essentially required that all the wavelength $\lambda_K'$ (K=1, 2, . . . , Y) must not be coincided with any $\lambda_K'''$ (K=1, 2, . . . , Y). For example, in order to satisfy the requirement it is possible to satisfying the condition: $\lambda_1' < \lambda_Y''$. Pump wavelength of the first wavelength portion $\lambda_{P1}$ and second wavelength portion $\lambda_{P2}$ is determined by the frequency phase-matching condition and are provided as $$\lambda_{p1} = 2\left(\frac{\lambda_Y \lambda_Y'}{\lambda_Y + \lambda_Y'}\right) \quad (12)$$

$$\lambda_{p2} = 2\left(\frac{\lambda_Y \lambda_Y''}{\lambda_Y + \lambda_Y''}\right) \quad (13)$$

From the propagation constant phase-matching condition, zero-dispersion wavelength of the optical fiber in the first and second wavelength conversion portion must be in the vicinity of the $\lambda_{P1}$ and $\lambda_{P2}$ respectively. By satisfying all the above conditions, it is possible to configure any wavelength of the lightwaves in three WDM lightwaves before combining the optical combiner 41 is not duplicated in the wavelength domain.

Twelfth Embodiment of Wavelength Converter

Figure 25:
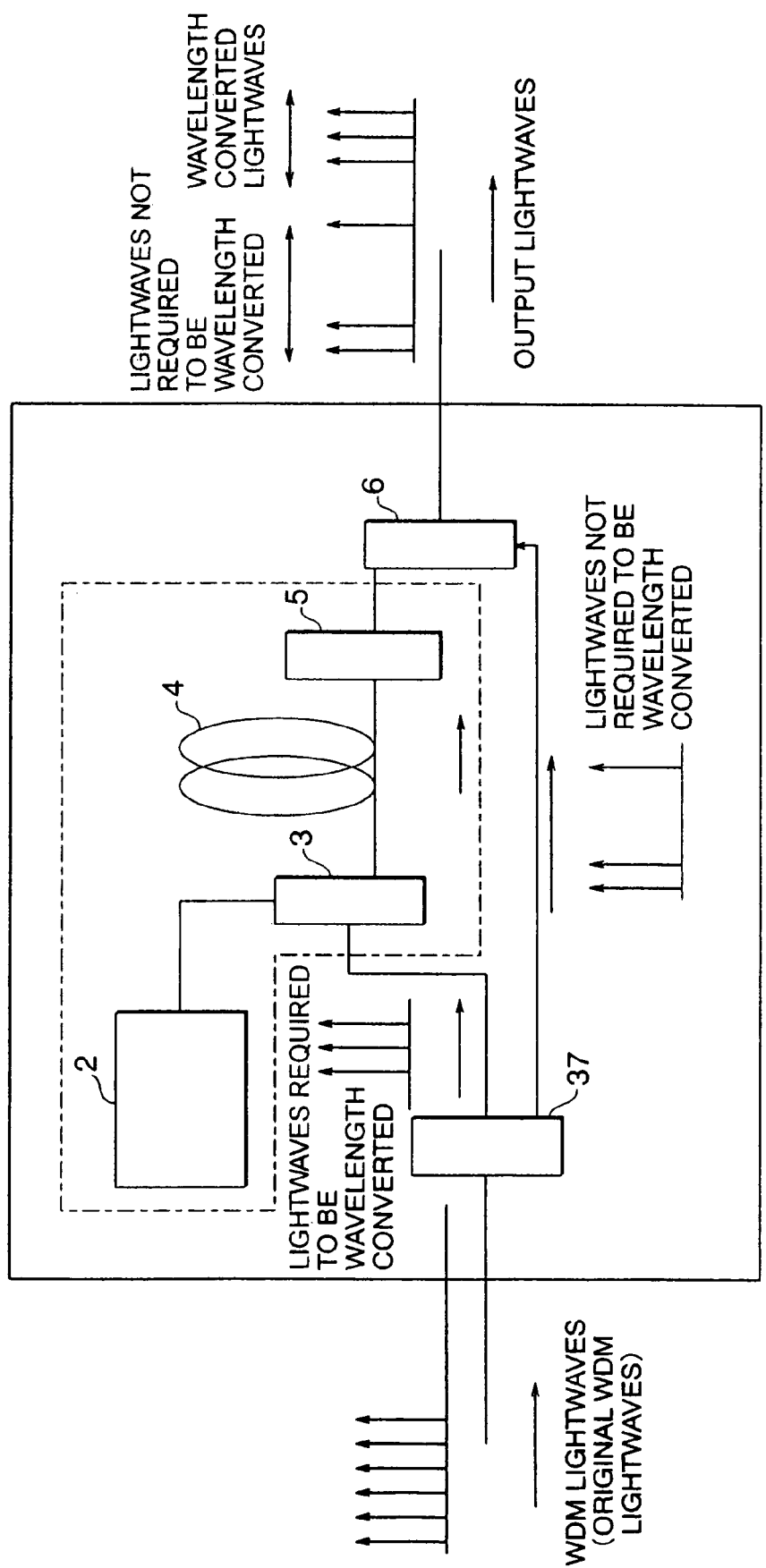
FIG. 25 is an explanatory view showing the wavelength converter according to the eleventh embodiment of the present invention.

FIG. 25 shows a wavelength converter according to a twelfth embodiment of the present invention. The wavelength converter corresponds to an alternation of the aforementioned sixth aspect of the present invention. According to the wavelength converter appeared in FIG. 25, lightwaves required to be wavelength converted are filtered out from the WDM lightwaves inputted to the wavelength converter (referred to be the original lightwaves, hereafter in this embodiment) by an optical band-pass filter 37. The filtered out WDM lightwaves are constituents of the original WDM lightwaves and are equivalent to the sub-band of the original WDM lightwaves from the analogy of the concept of the sub-band as shown in the sixth embodiment of the document. The filtered out sub-band is wavelength converted simultaneously by use of the FWM in the optical fiber 4. According to the FIG. 25, the filtered out lightwaves in the sub-band is the lightwaves required to be wavelength converted, and are combined with the pump light from the pump source 2 by an optical combiner 3. The combined lightwaves are launched into the optical fiber 4 and the wavelength converted lightwaves are generated by FWM in the fiber 4. Solely the wavelength converted lightwaves are filtered, out from the lightwaves output from the optical fiber 4 by an optical filter 5. Consequently, the lightwaves required to be wavelength converted that are outputted from the optical filter 37, are simultaneously wavelength converted by the wavelength conversion portion 10. The wavelength converted lightwaves outputted from the wavelength conversion portion 10 are combined with the lightwaves not required to be wavelength converted that are outputted from the optical filter 37, by an optical combiner 6 without duplication in wavelength domain. The combined lightwaves are outputted from the wavelength converter. As a resultant of the wavelength conversion processes of the wavelength converter, as shown in FIG. 25, one sub-band of the original WDM lightwaves is wavelength converted simultaneously to the outside of the full band of the original WDM lightwaves in the wavelength domain by the wavelength converter described in this embodiment. The optical fiber 4 shown in FIG. 25 can be replaced to an SOA.

First Embodiment of Wavelength-division Multiplexing Transmission Method)

Figure 26:
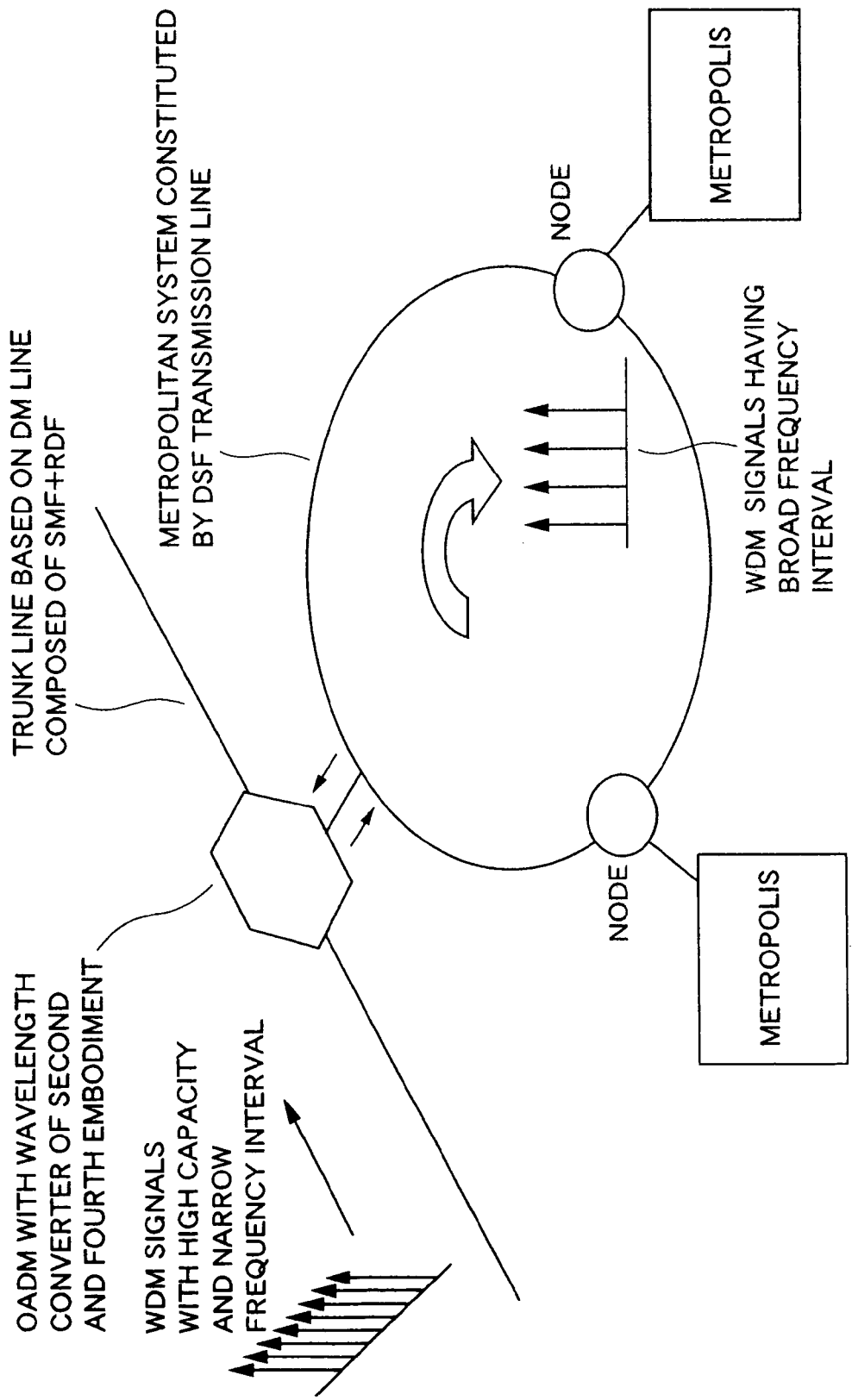
FIG. 26 is an explanatory schematic showing a WDM transmission method according to an embodiment of the present invention.

FIG. 26 shows an embodiment of a wavelength-division multiplexing method corresponding to the aforementioned twelfth to fourteenth aspect of the method in the present invention. Concerning the following high capacity and long distance WDM communication systems: A trunk line is composed of the conventional single-mode fiber (referred as SMF hereafter) and dispersion compensating fibers, e.g., Reverse-Dispersion Fiber (referred as RDF hereafter). Efficiency of the so-called transmission line composed of the Dispersion Managed line (referred as DM line hereafter), e.g., transmission line composed of the SMF and RDF, are verified experimentally. Under the optimized design of the DM line, the transmission line can suppress the noise from the inter-channel crosstalk due to inter-channel FWM. On the contrary of such efficiency of the DM line, the transmission line composed of the conventional dispersion-shifted fiber (referred as DSF line hereafter) that is more influenced by the FWM than the DM line, are sometimes used in the metropolitan area network since the metropolitan area network is not required such a high-capacity transmission in comparison of the trunk line. In general, the frequency interval of the WDM signals transmitted in the metropolitan area network, are broader than the interval of the trunk line, and furthermore the bit-rate of the signals per channel is smaller than the bit-rate of the trunk line.

In the above circumstances, the WDM signals transmitted to the trunk line cannot be dropped to the metropolitan line directly with preserving the frequency intervals of the WDM signals. The inter-channel FWM will deteriorate the signal to noise ratio because of the difference of the influence of the crosstalk due to FWM. The wavelength converter provided in the aforementioned fourth and fifth aspects of the present invention resolve the problem. The wavelength converter provided the fourth and fifth aspects of the present invention can broaden the frequency interval of the WDM signals inputted to the wavelength converter. Thus under the optimized design of the wavelength converter, the influences of the FWM induced inter-channel crosstalk is negligible in spite of the use of the DSF line.

Figure 27:
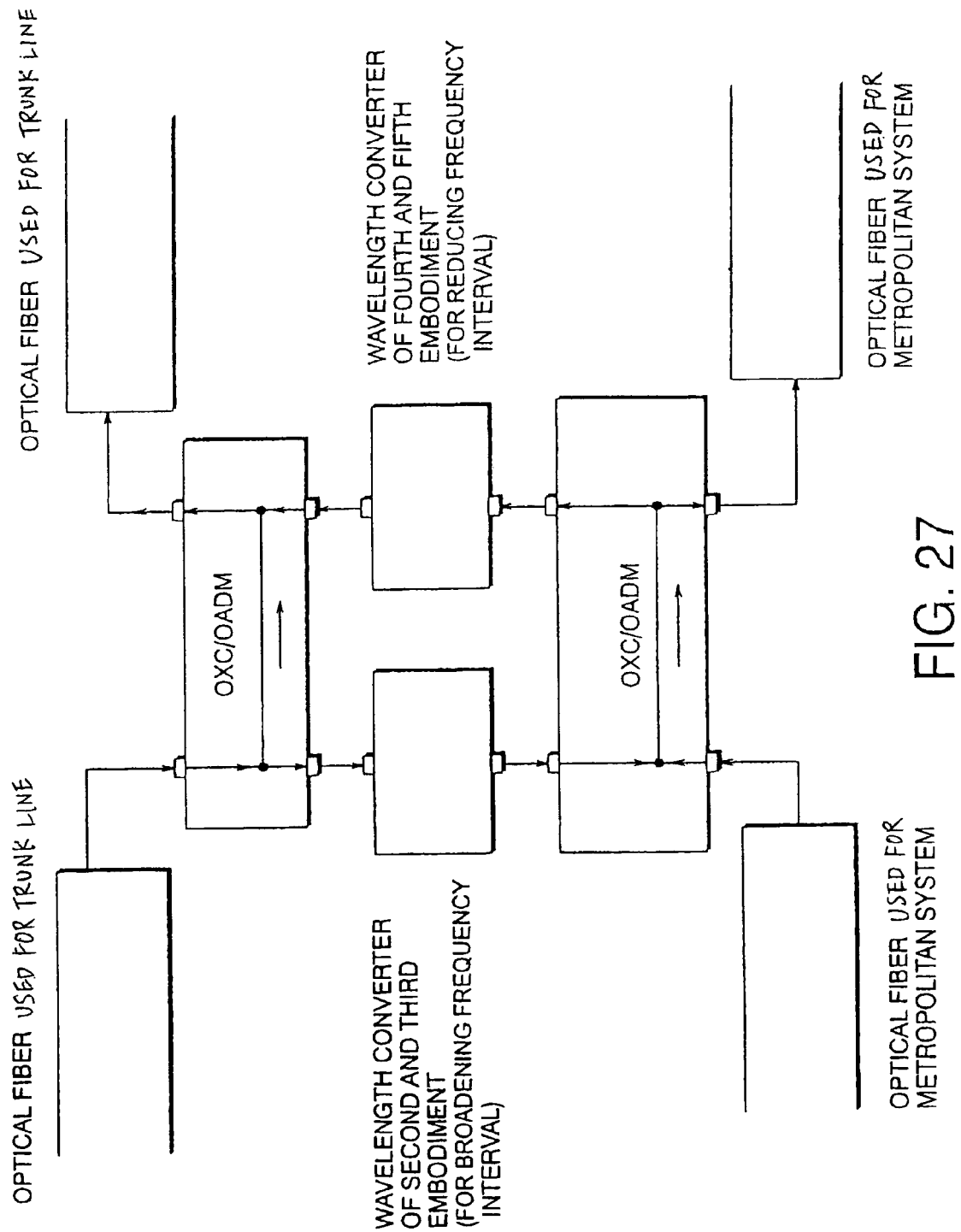
FIG. 27 is a view for explaining usage of optical add-drop multiplexers shown in FIG. 26.

Transfer of the WDM signals from a metropolitan area network to the trunk line is also required. In the case, WDM signals processing opposite to the above is necessary. Namely, the frequency interval of the WDM signals from the metropolitan network is required to be narrower in order to transfer the signals to the trunk line without lack of the efficiency of the DM line used to the trunk line. Otherwise the advantages of the DM line are not utilized sufficiently. To resolve the problem, the wavelength converter provided in the aforementioned sixth and seventh aspects of the present invention are applicable. The wavelength converter provided the sixth and seventh aspects of the present invention can reduce the frequency interval of the WDM signals input to the wavelength converter. Thus the influences of the FWM induced inter-channel crosstalk is increased as large as the DM line (SMF+RDF in FIG. 26) can compensate for. An optical add-drop multiplexer/demultiplexer (OADM) applicable to connect the trunk line and the metropolitan area network (or equivalently, DM line and DSF line in FIG. 27) can realize the above two functionality. The wavelength converter provided in the second or sixth embodiment (or sixth or ninth embodiment) can connect the trunk line and the metropolitan area network by avoiding the problems discussed above. In FIG. 27, OXC is used as an acronym of the Optical Cross Connect.

Effect of the Invention

The wavelength converter according to the present invention has the following effects:

1. Solely the lightwaves required to be wavelength converted are filtered out from all the input broadband WDM lightwaves, and then be wavelength converted simultaneously by use of the FWM.

2. WDM lightwaves reconfigured by the wavelength conversion from the input WDM lightwaves in wavelength domain are combined with the lightwaves all of whose wavelength is not coincided with the any of the wavelength of the reconfigured WDM lightwaves to obtain an alternative WDM lightwaves.

3. Since the frequency interval of the WDM lightwaves can be broaden or be reduced, the two WDM system with different transmission capacities can be connected together by spending low cost, and the optical interconnection between the two systems can be realized without lack of the advantages of each system. The wavelength-division multiplexing transmission method according to the present invention has the following effects:

1. By utilizing the flexibility of the FWM based multichannels simultaneous converter according to the present invention, flexible WDM networks can be realized.

2. By utilizing the wavelength converter according to the present invention, interconnection of the independently designed two WDM systems can be realized.

3. By utilizing the wavelength converter according to the present invention, frequency interval of the WDM signals can be changed to optimize the transmission capacity of the transmission line, and therefore WDM signals can be added or dropped between two independent transmission lines without lack of the advantages of the two lines.

Wavelength Converter Using DFG

A wavelength converter using difference frequency generation (DFG) can be used instead of the wavelength converter using FWM for the first to the twelfth embodiments of wavelength converter and the first embodiment of wavelength-division multiplexing transmission method.

DFG is wavelength conversion using a high non-linear medium. The high nonlinear medium includes an oxidized high dielectric material with quasi-phase-matching (QPM) construction such as $LiNbO_3$, $LiTaO_3$ and the like, or a compound semiconductor such as AlGaAs and the like. The high nonlinear medium also includes a photonic crystal, a photonic crystal fiber such as a hole-assisted fiber, photonic band-gap and the like.

If the nonlinear element 4 as shown in FIG. 1 is replaced with a high non-linear medium with quasi-phase-matching (QPM) construction such as a periodically poled $LiNbO_3$ (PPLN) waveguide and the like, the wavelength conversion using DFG can be applied for all the above-mentioned embodiments. Details of the wavelength conversion using DFG will be hereinafter explained.

As the WDM channel spacing becomes narrower according to the increase of the traffic demand, 25 GHz-spaced DWDM transmission has been investigated intensively in order to pursue better use of limited transmission bandwidths. Photonic networks based on DWDM require wavelength conversion to accommodate wavelength paths in which low crosstalk, small guard band conversion is suitable especially for grouped-wavelength path routing and multiband transmission. Parametric wavelength conversion is one of the key technologies to handle these demands without bit rate and modulation format dependency. However, wide guard bands around the pump wavelength are normally required to suppress the signal quality degradation due to the parametric crosstalk among the WDM signals in the conversion process, especially when the channel spacing becomes narrower. So far, 32 ch, 100 GHz-spaced conversion have been demonstrated based on fiber FWM with a 12.8 nm guard band. Wavelength conversion using PPLN waveguides based on QPM is expected to offer high efficiency, narrower-channel-spaced wavelength conversion with low crosstalk and small guard band arising from its strict phase matching condition.

Experiment and results regarding inter-band wavelength conversion of 25 GHz-spaced, 1.03 Tbit/s (103×10 Gbit/s) DWDM signals with a small guard band of 8 nm (4 nm×2) and Q-factors of more than 15.6 dB, using a high efficiency PPLN waveguide is explained below.

Figure 28:
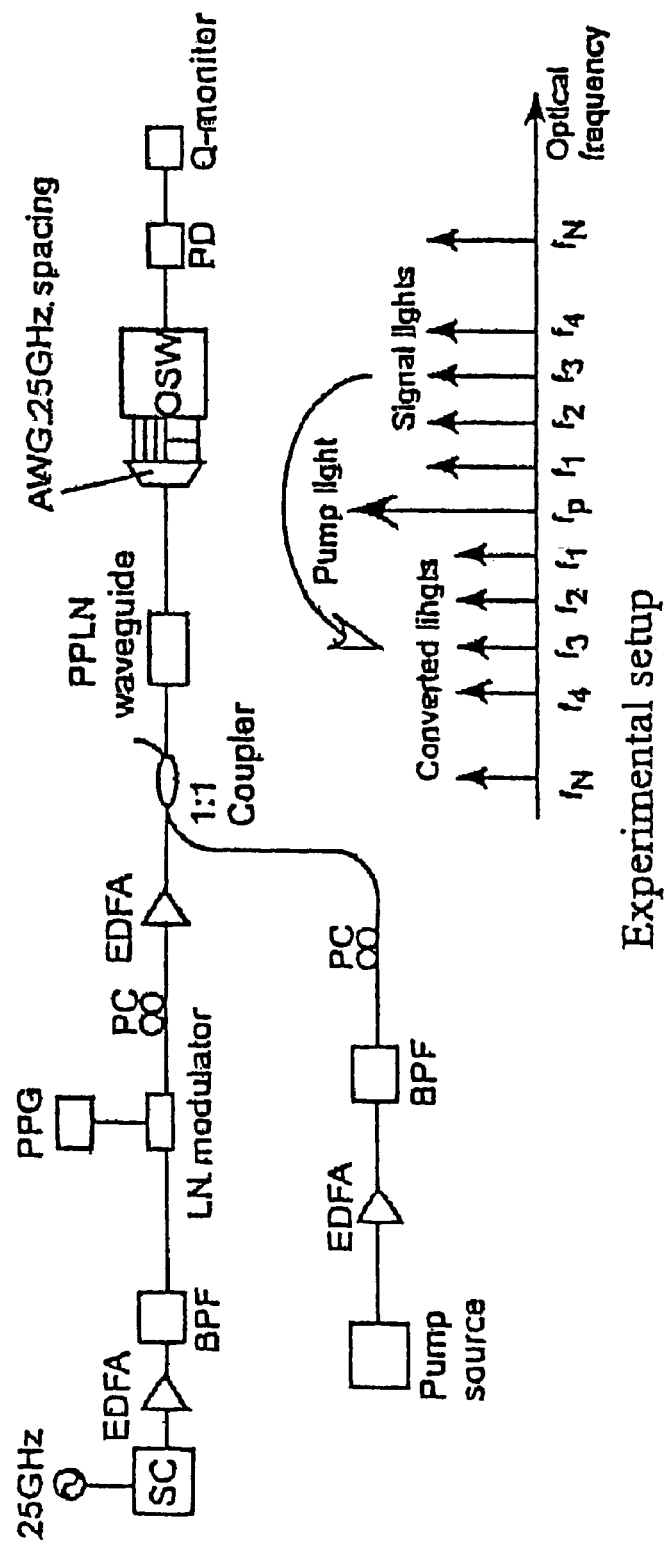
FIG. 28 illustrates an exemplary set-up of a wavelength converter in accordance with another embodiment of the invention.

FIG. 28 shows the experimental set up. As in the inset of the figure, the optical frequency of pump light $f_p$ is set at the phase-matched frequency $f_0$ of the PPLN. Firstly, the pump light $f_p$ is converted to its SHG (second harmonic generation) light $2f_0$. Firstly, the pump light $f_p$ is converted to its SHG (second harmonic generation) light $2f_0$. Next, signals are converted to DFG light $f_x=2 f_0-f_{x'}$. 1.03 Tbit/s (103×10 Gbit/s), 25 GHz-spaced DWDM signals (1531–1551 nm) are generated by modulating a 25 GHz-spaced superontinuum (SC) lightwave source with a NRZ format ($PRBS2^{11}-1$). Signal lights and a pump light are coupled to the PPLN waveguide with input optical powers of −10 dBm/ch and 23 dBm, respectively and a guard band of 8 nm (4 nm×2). A pigtailed PPLN module is a 50 mm annealed proton exchanged waveguide with a 15 μm OPM pitch. Converted signals are selected by a 25 GHz-spaced AWG and an optical switch (OSW), and Q-factors were measured for each channel. FIG. 29 shows the output spectrum of the PPLN waveguide. Internal and external conversion efficiency were about −13 dB/ch and −15 db/ch, respectively. FIG. 30 shows the converted Q-factor for 103 channels. They exceeded 15.6 dB, corresponding to the BERs of less than $10^{-9}$.

As stated, simultaneous wavelength conversion of 1.03 Tbit/s (103×10 Gbit/s), 25 GHz-spaced DWDM signals is successfully demonstrated in a PPLN waveguide from C-band to L-band with a small guard band of 8 nm and converted signal Q-factors of more than 15.6 dB. The device is expected to play a major role in photonic networks with improved conversion efficiency.

What is claimed is:

1. A wavelength converter using difference frequency generation (DFG) comprising:
   (a) a first optical filter configured to filter out one or more lightwaves requiring wavelength conversion from wavelength-division multiplexed (WDM) lightwaves; and
   (b) a broadband multi-channel simultaneous wavelength conversion portion comprising a pump source that generates pump light for use in the process of the DFG, a first optical combiner for combining said pump light with said filtered lightwaves, a high non-linear medium configured to generate wavelength converted lightwaves from said filtered lightwaves using the DFG, and a second optical filter for filtering said wavelength converted lightwaves from said filtered lightwaves.

2. The wavelength converter according to claim 1, wherein said high non-linear medium comprises a quasi-phase-matching (QPM) construction.

3. The wavelength converter according to claim 2, wherein said high non-linear medium comprises a periodically poled $LiNbO_3$ (PPLN) waveguide.

4. The wavelength converter according to claim 1, wherein said first optical filter is configured to filter out one or more lightwaves from each N channels of a lightwave, where N is a positive integer.

5. The wavelength converter according to claim 1, wherein said first optical filter comprises a dielectric multi-layered filter configured to filter out one or more clusters of lightwaves (sub-bands) in wavelength domains.

6. The wavelength converter according to any one of claims 1 to 5, wherein a second optical combiner is connected after said broadband multi-channel simultaneous wavelength conversion portion and said first optical filter, and wherein said second optical combiner is configured to combine output lightwaves of said broadband multi-channel simultaneous wavelength conversion portion with lightwaves not inputted to said broadband multi-channel simultaneous wavelength conversion portion by said first optical filter.

7. The wavelength converter according to any one of claims 1 to 5, wherein a second optical combiner is connected after said broadband multi-channel simultaneous wavelength conversion portion and is configured to combine output lightwaves of said broadband multi-channel simultaneous wavelength conversion portion with externally launched WDM lightwaves.

8. The wavelength converter according to claim 6, wherein an optical demultiplexer is connected after said second optical combiner to demultiplex output lightwaves of said second optical combiner.

9. The wavelength converter according to claim 1, further comprising:
   another broadband multi-channel simultaneous wavelength conversion portion connected in series with said broadband multi-channel simultaneous wavelength conversion portion to convert wavelengths of lightwaves filtered out by said first optical filter,
   wherein wavelengths of lightwaves filtered out by said first optical filter are converted without losing any information carried by the lightwaves.

10. The wavelength converter according to claim 1, further comprising:
   (c) an optical divider having first and second ports for outputting two groups of lightwaves filtered out by said first optical filter;
   (d) an optical combiner for combining lightwaves output on said first port of said optical divider with lightwaves not inputted to said optical divider by said first optical filter; and
   (e) another broadband multi-channel simultaneous wavelength conversion portion connected in series with said broadband multi-channel simultaneous wavelength conversion portion to convert wavelengths of lightwaves output on said second port of said optical divider.

11. The wavelength converter according to claim 10, wherein an optical amplifier is inserted between said optical divider and said optical combiner to amplify output lightwaves from said optical divider.

12. The wavelength converter according to claim 1 further comprising:
   (c) a second optical filter configured to filter out one or more lightwaves required to be wavelength converted from lightwaves not inputted to said broadband multi-channel simultaneous wavelength conversion portion by said first optical filter; and
   (d) another broadband multi-channel simultaneous wavelength conversion portion configured to convert wavelengths of lightwaves filtered out by said second optical filter;
   (e) a second optical combiner for combining output lightwaves from said other broadband multi-channel simultaneous wavelength conversion portion with lightwaves not inputted to said other broadband multi-channel simultaneous wavelength conversion portion by said second optical filter; and
   (f) an optical wavelength combiner to combine output lightwaves from said broadband multi-channel simultaneous wavelength conversion portion with output lightwaves from said optical combiner.

13. The wavelength converter according to claim 12, wherein an optical demultiplexer is connected after said optical wavelength combiner to demultiplex output lightwaves of said optical wavelength combiner.

14. The wavelength converter according to claim 1, further comprising:
   (c) an optical divider configured to divide WDM lightwaves into one or more groups of lightwaves required to be wavelength converted and lightwaves not required to be wavelength converted; and
   (d) an optical combiner configured to combine lightwaves in said one or more groups of lightwaves not required to be wavelength converted with converted lightwaves from said broadband multi-channel simultaneous wavelength conversion portions, wherein at least one broadband multi-channel simultaneous wavelength conversion portion is configured to convert wavelengths of said lightwaves in said one or more groups of lightwaves required to be wavelength converted.

* * * * *